(12) United States Patent
Muthuganesan

(10) Patent No.: US 12,288,104 B2
(45) Date of Patent: Apr. 29, 2025

(54) SYSTEM AND METHOD FOR USER DEVICES IN CLOUD COMPUTING ENVIRONMENT

(71) Applicant: Marvell Asia Pte Ltd, Singapore (SG)

(72) Inventor: Thiagarajan Muthuganesan, Bangalore (IN)

(73) Assignee: Marvell Asia Pte Ltd, Singapore (SG)

( * ) Notice: Subject to any disclaimer, the term of this patent is extended or adjusted under 35 U.S.C. 154(b) by 379 days.

(21) Appl. No.: 17/246,458

(22) Filed: Apr. 30, 2021

(65) Prior Publication Data
US 2022/0188171 A1 Jun. 16, 2022

Related U.S. Application Data

(60) Provisional application No. 63/126,512, filed on Dec. 16, 2020.

(51) Int. Cl.
*G06F 9/50* (2006.01)
*G06F 9/455* (2018.01)
(Continued)

(52) U.S. Cl.
CPC ........ *G06F 9/5072* (2013.01); *G06F 9/45558* (2013.01); *G06F 9/4856* (2013.01);
(Continued)

(58) Field of Classification Search
CPC .................................................. G06F 9/5072
See application file for complete search history.

(56) References Cited

U.S. PATENT DOCUMENTS 5,790,862 A 8/1998 Tanaka et al.
8,656,019 B2 2/2014 Chikando et al.
(Continued)

OTHER PUBLICATIONS

U.S. Notice of Allowance for U.S. Appl. No. 17/246,470, entitled "Liaison System and Method for Cloud Computing Environment," mailed on Aug. 12, 2022.
(Continued)

*Primary Examiner* — Charlie Sun
(74) *Attorney, Agent, or Firm* — Hamilton, Brook, Smith & Reynolds, P.C.

(57) ABSTRACT

A system and corresponding method consumerize cloud computing by incorporating consumer devices into an infrastructure of cloud computing environment. The consumer device comprises a client job manager that spawns a processing task on the consumer device responsive to a job request to perform at least a portion of a computational job. The computational job is requested by an end user device to be performed via cloud computing. The consumer device further comprises a network interface. The job request is received via the network interface from a cloud job manager of a cloud service provider system of a cloud service provider. The processing task performs the at least a portion of the computational job. The consumer device is selected by the cloud job manager based, at least in part, on proximity of the consumer device to the end user device and at least one characteristic of the consumer device. The client job manager communicates the at least one characteristic to the cloud job manager via the network interface.

25 Claims, 12 Drawing Sheets

(51) Int. Cl.
  *G06F 9/48* (2006.01)
  *G06F 9/54* (2006.01)
  *G06F 11/30* (2006.01)
  *G06F 21/60* (2013.01)
  *H04L 67/1029* (2022.01)
  *H04L 47/783* (2022.01)

(52) U.S. Cl.
  CPC .......... *G06F 9/4881* (2013.01); *G06F 9/5005* (2013.01); *G06F 9/505* (2013.01); *G06F 9/542* (2013.01); *G06F 11/3058* (2013.01); *G06F 21/602* (2013.01); *H04L 67/1029* (2013.01); *G06F 2009/45595* (2013.01); *H04L 47/783* (2013.01)

(56) References Cited

U.S. PATENT DOCUMENTS

| | | | |
|---|---|---|---|
| 9,946,577 | B1 * | 4/2018 | Stafford ................ G06F 9/5061 |
| 10,368,283 | B2 | 7/2019 | Ji et al. |
| 10,372,499 | B1 | 8/2019 | Radhakrishnan et al. |
| 11,087,412 | B1 | 8/2021 | Ho et al. |
| 11,461,147 | B2 | 10/2022 | Muthuganesan |
| 11,699,093 | B2 | 7/2023 | Nookula et al. |
| 11,755,379 | B2 | 9/2023 | Muthuganesan |
| 11,762,442 | B1 | 9/2023 | Merli et al. |
| 2010/0125758 | A1 | 5/2010 | Yang et al. |
| 2010/0153960 | A1 | 6/2010 | Youn et al. |
| 2012/0016721 | A1 | 1/2012 | Weinman |
| 2012/0204187 | A1 | 8/2012 | Breiter et al. |
| 2012/0210323 | A1 | 8/2012 | Hosouchi et al. |
| 2013/0219406 | A1 | 8/2013 | Hatabe et al. |
| 2013/0346470 | A1 | 12/2013 | Obstfeld et al. |
| 2014/0189389 | A1 | 7/2014 | Lynar et al. |
| 2015/0106823 | A1 | 4/2015 | Canoy et al. |
| 2015/0205888 | A1 | 7/2015 | He et al. |
| 2016/0034306 | A1 | 2/2016 | Galdy et al. |
| 2016/0044035 | A1 | 2/2016 | Huang |
| 2016/0066278 | A1 | 3/2016 | Zhao et al. |
| 2016/0366023 | A1 * | 12/2016 | Higgins ................ H04L 67/52 |
| 2017/0230304 | A1 | 8/2017 | Liu et al. |
| 2017/0364136 | A1 | 12/2017 | Nandha et al. |
| 2018/0183855 | A1 | 6/2018 | Sabella et al. |
| 2018/0270328 | A1 | 9/2018 | Agarwal et al. |
| 2019/0050245 | A1 | 2/2019 | Bhageria |
| 2019/0208007 | A1 | 7/2019 | Khalid |
| 2019/0220783 | A1 | 7/2019 | Nookula et al. |
| 2019/0238347 | A1 | 8/2019 | Martineau et al. |
| 2020/0184086 | A1 | 6/2020 | Bishop et al. |
| 2020/0384369 | A1 | 12/2020 | Holmes et al. |
| 2021/0058473 | A1 | 2/2021 | Yerli |
| 2021/0110191 | A1 | 4/2021 | Gruteser et al. |
| 2021/0136142 | A1 | 5/2021 | Dong |
| 2021/0144198 | A1 | 5/2021 | Yu et al. |
| 2021/0182118 | A1 | 6/2021 | Sahin |
| 2021/0385618 | A1 | 12/2021 | Modarres et al. |
| 2022/0103553 | A1 | 3/2022 | Iyer et al. |
| 2022/0159785 | A1 | 5/2022 | Foukas et al. |
| 2022/0188152 | A1 | 6/2022 | Muthuganesan |
| 2022/0191273 | A1 | 6/2022 | Muthuganesan |
| 2022/0197773 | A1 | 6/2022 | Butler et al. |
| 2022/0210686 | A1 | 6/2022 | Zhang et al. |
| 2022/0360645 | A1 | 11/2022 | Badic et al. |
| 2022/0413933 | A1 | 12/2022 | Muthuganesan |
| 2023/0171154 | A1 | 6/2023 | Kattepur et al. |

OTHER PUBLICATIONS

U.S. Non-Final Office Action for U.S. Appl. No. 17/246,470, entitled "Liaison System and Method for Cloud Computing Environment," mailed on Mar. 3, 2022.
U.S. Appl. No. 17/246,470, entitled "Liaison System and Method for Cloud Computing Environment," filed on Apr. 30, 2021.
U.S. Appl. No. 17/246,445, entitled "System and Method for Consumerizing Cloud Computing," filed on Apr. 30, 2021.
Robert Williams; "Forrester: Global mobile users to exceed 5.5B by 2022"; published Jul. 18, 2017; https://www.mobilemarketer.com/news/forrester-global-mobile-users-to-exceed-55b-by-2022/447285/.
Christophe C'erin et al.; "Downtime statistics of current cloud solutions" (Jun. 2013 Update); Telecom ParisTech yGalileo Institute z, Institut Mines-Telecom ANDSI Alter Way Cedexis HSC Nexedi VIFIB DSI Groupe LaPoste.
Wikipedia, "Cloud computing," retrieved from the Internet on Apr. 21, 2021.
U.S. Non-Final Office Action for U.S. Appl. No. 17/823,181, entitled "Liaison System and Method for Cloud Computing Environment," mailed on Jan. 25, 2023.
Notice of Allowance for U.S. Appl. No. 17/823,181, entitled "Liaison System and Method for Cloud Computing Environment;" mailed on Apr. 27, 2023.
Non-Final Office Action received for U.S. Appl. No. 17/246,445, mailed on Feb. 29, 2024, 47 pages.
Final Office Action received for U.S. Appl. No. 17/246,445, mailed on Jul. 24, 2024, 44 pages.
Non-Final Office Action received for U.S. Appl. No. 17/246,445, mailed on Nov. 21, 2024, 48 pages.

* cited by examiner

| STAKE HOLDER | INVESTMENT | RETURN ON INVESTMENT (ROI) |
|---|---|---|
| Cloud Provider | Non-recurring engineering (NRE) cost and implementation cost | Low cost advantage due to less utilization of its own computing resources and reduced dependency on high power computing resources. Reduced cost of maintenance. Reduced networking bill as the job can be routed with shortest path from request origin to destination (e.g., smart phone). Reduced cost from real estate and power bill. |
| Smart Phone Lender | Battery power, Network bill if using mobile data network | Pay back from the cloud provider. |
| Cloud End User | Nothing | Reduced bill from the cloud provider, as the cost of cloud reduces. |
| Middle Liaison (Global cloud) | New establishment cost- computing resources, human resources for engineering, NRE in developing algorithms for job monitoring and handling. | Pay back from the cloud provider. |
| Middle Liaison (Mini Cloud) | Human resources for engineering and maintenance, NRE in developing algorithms for job monitoring and handling. | Pay back from private firms deploying mini clouds for establishment and maintenance. |

FIG. 7

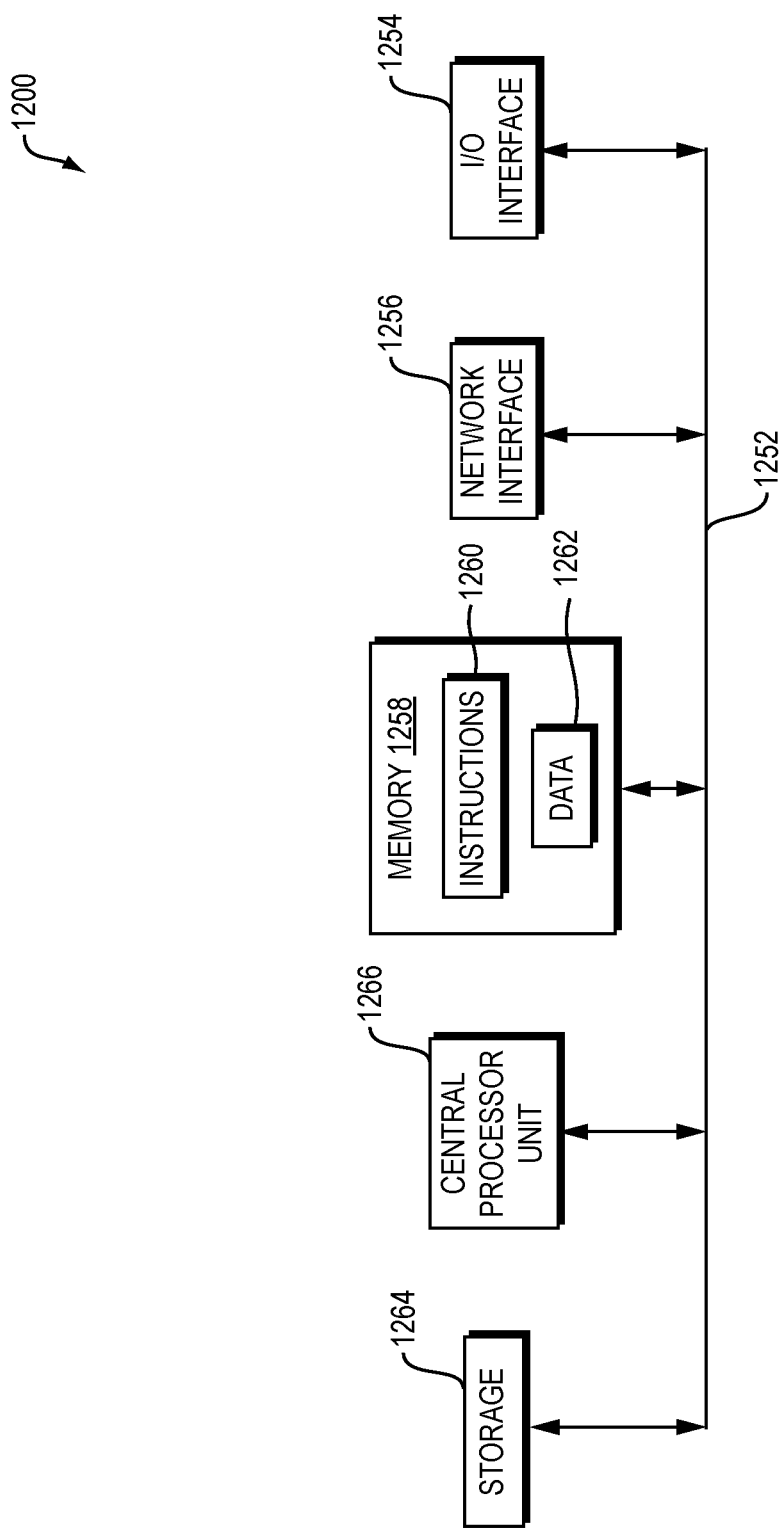

SYSTEM AND METHOD FOR USER DEVICES IN CLOUD COMPUTING ENVIRONMENT

RELATED APPLICATION

This application claims the benefit of U.S. Provisional Application No. 63/126,512, filed on Dec. 16, 2020. The entire teachings of the above application are incorporated herein by reference.

BACKGROUND

Cloud computing is the delivery of computing services—including servers, storage, databases, networking, software, computing power, etc.—over the Internet ("the cloud"). With cloud computing, a virtualized pool of resources, from raw compute power to application functionality, is made available to a client, on demand, by a provider. An advantage of cloud computing is agility: the ability to apply abstracted versions of compute, storage, and network resources to workloads, as needed, and tap into an abundance of prebuilt services. Cloud computing enables users to gain new capabilities without investing in new hardware or software. Instead, users pay their cloud provider a subscription fee or pay for only the resources they use.

SUMMARY

According to an example embodiment, a consumer device comprises a client job manager configured to spawn a processing task on the consumer device responsive to a job request to perform at least a portion of a computational job. The computational job is requested by an end user device to be performed via cloud computing. The consumer device further comprises a network interface. The job request is received via the network interface from a cloud job manager of a cloud service provider system of a cloud service provider. The processing task is configured to perform the at least a portion of the computational job. The consumer device is selected by the cloud job manager based, at least in part, on proximity of the consumer device to the end user device and at least one characteristic of the consumer device. The client job manager is further configured to communicate the at least one characteristic to the cloud job manager via the network interface.

The consumer device may be a smart phone, tablet, laptop computer, desktop computer, or other portable or non-portable programmable consumer electronic device capable of computation as well as receiving and sending data via a network for non-limiting example.

The job request may be received with a corresponding identifier and data. The client job manager may be further configured to associate the corresponding identifier received with the processing task spawned. The processing task spawned may be configured to employ the data to perform the at least a portion of the computational job.

The client job manager may be further configured to track the processing task spawned and notify the cloud job manager via the network interface of completion of the at least a portion of the computational job.

The client job manager may be further configured to track the processing task spawned and transmit, via the network interface, information collected from the processing task spawned to the cloud job manager or a data handler coupled to the cloud job manager.

The client job manager may be a given client job manager of a plurality of client job managers of the consumer device. The given client job manager may be configured to employ security measures to ensure data integrity of data associated with the at least a portion of the computational job is maintained, such that another client job manager of the plurality of client job managers or another process of the consumer device does not interfere with, tamper with, or capture data associated with the at least a portion of the computational job.

The consumer device may further comprise a processor. The client job manager may be further configured to track usage parameters associated with implementing the at least a portion of the computational job. The usage parameters may include, for non-limiting example, total usage time of the processor, per-process usage time of the processor, data network usage, or a combination thereof.

The at least one characteristic may include, for non-limiting example, device health information, device capability information, or a combination thereof. The device health information may include, for non-limiting example, resource utilization, battery power available, battery health, processor load, user application prioritization, data network speed, virtual machine (VM) availability, type of network connectivity, load sharing, device availability information derived from a user profile associated with the consumer device, or a combination thereof. The device capability information may include processor capability, storage capability, estimate for battery drain over time, other capability information derived from a make and model of the consumer device, or a combination thereof, for non-limiting example.

The consumer device may further comprise at least one subsystem and the at least one characteristic may be obtained by the client job manager from the at least one subsystem.

The client job manager may be further configured to communicate in a secure manner with a cloud job manager over the network interface. The secure manner may include splitting data communicated therebetween into multiple sequences with respective sequence ID values assigned thereto and applying an encryption method to the multiple sequences. The cloud job manager and client job manager may form a pairing of job managers and the encryption method may be limited to interpretation by the job managers in the pairing.

The cloud job manager may be a first cloud job manager. The cloud service provider system may be a first cloud service provider system of a first cloud service provider. The client job manager may be a first client job manager, the processing task may be a first processing task, the job request may be a first job request, the computational job may be a first computational job, and the end user device may be a first end user device. The first computational job may be requested by the first end user device to be performed via cloud computing of the first cloud service provider.

The consumer device may further comprise a second client job manager. The second client job manager may be configured to spawn a second processing task on the consumer device responsive to a second job request to perform at least a portion of a second computational job. The second computational job may be requested by a second end user device to be performed via cloud computing of a second cloud service provider. The second job request may be received from a second cloud job manager via the network interface from a second cloud service provider system of the second cloud service provider. The second processing task may be configured to perform the at least a portion of the second computational job. The consumer device may be selected by the second cloud job manager based, at least in part, on proximity of the consumer device to the second end user device and at least one characteristic of the consumer device. The second client job manager may be further configured to communicate the at least one characteristic to the second cloud job manager via the network interface.

According to another example embodiment, a computer-implemented method comprises communicating, via a network interface of a consumer device, at least one characteristic of the consumer device to a cloud job manager of a cloud service provider system of a cloud service provider. The computer-implemented method further comprises spawning a processing task on the consumer device responsive to a job request. The job request is received via the network interface from the cloud job manager. The job request is a request to perform at least a portion of a computational job. The computational job is requested by an end user device to be performed via cloud computing. The consumer device is selected by the cloud job manager based, at least in part, on proximity of the consumer device to the end user device and the at least one characteristic communicated. The computer-implemented method further comprises performing, by the processing task spawned, the at least a portion of the computational job.

Further alternative method embodiments parallel those described above in connection with the example consumer device embodiment.

According to another example embodiment, a non-transitory computer-readable medium has encoded thereon a sequence of instructions which, when loaded and executed by at least one processor, causes the at least one processor to communicate, via a network interface of a consumer device, at least one characteristic of the consumer device to a cloud job manager of a cloud service provider system of a cloud service provider. The sequence of instructions further causes the processor to spawn a processing task on the consumer device responsive to a job request. The job request is received via the network interface from the cloud job manager. The job request is a request to perform at least a portion of a computational job. The computational job is requested by an end user device to be performed via cloud computing. The consumer device is selected by the cloud job manager based, at least in part, on proximity of the consumer device to the end user device and the at least one characteristic communicated. The sequence of instructions further causes the processor to perform, via the processing task spawned, the at least a portion of the computational job.

Alternative non-transitory computer-readable medium embodiments parallel those described above in connection with the example consumer device embodiment.

According to another example embodiment, a system for cloud computing comprises means for communicating at least one characteristic of a consumer device to a cloud job manager of a cloud service provider system of a cloud service provider. The system further comprises means for receiving a job request from the cloud job manager. The job request is a request to perform at least a portion of a computational job. The computational job is requested by an end user device to be performed via cloud computing. The consumer device is selected by the cloud job manager based, at least in part, on proximity of the consumer device to the end user device and the at least one characteristic communicated. The system further comprises means for performing the at least a portion of the computational job responsive to the job request received.

According to another example embodiment, an apparatus comprises a network interface and a processor coupled to the network interface. The processor is configured to transmit, via the network interface, an end user request to a cloud service provider system of a cloud service provider. The processor is further configured to transmit, via the network interface, location information of the apparatus to the cloud service provider system. The end user request is for performing a computational job via cloud computing. At least a portion of the computational job is assigned to a consumer device selected by the cloud service provider system. The consumer device is selected, at least in part, based on at least one characteristic of the consumer device and proximity of the consumer device to the apparatus. The proximity is determined by the cloud service provider system based on the location information transmitted.

According to another example embodiment, a computer-implemented method comprises transmitting, via a network interface, location information of an end user device to a cloud service provider system of a cloud service provider. The computer-implemented method further comprises transmitting, via the network interface, an end user request to the cloud service provider system. The end user request is a request for performing a computational job via cloud computing. At least a portion of the computational job is assigned to a consumer device selected by the cloud service provider system. The consumer device is selected, at least in part, based on at least one characteristic of the consumer device and proximity of the consumer device to the end user device. The proximity is determined by the cloud service provider system based on the location information transmitted.

According to another example embodiment, a non-transitory computer-readable medium has encoded thereon a sequence of instructions which, when loaded and executed by at least one processor, causes the at least one processor to transmit, via a network interface, location information of an end user device to a cloud service provider system of a cloud service provider. The sequence of instructions further causes the processor to transmit, via the network interface, an end user request to the cloud service provider system. The end user request is a request for performing a computational job via cloud computing. At least a portion of the computational job is assigned to a consumer device selected by the cloud service provider system. The consumer device is selected, at least in part, based on at least one characteristic of the consumer device and proximity of the consumer device to the end user device. The proximity is determined by the cloud service provider system based on the location information transmitted.

According to another example embodiment, a system for cloud computing comprises means for transmitting location information of an end user device to a cloud service provider system of a cloud service provider and means for transmitting an end user request to the cloud service provider system. The end user request is a request for performing a computational job via cloud computing. At least a portion of the computational job is assigned to a consumer device selected by the cloud service provider system. The consumer device is selected, at least in part, based on at least one characteristic of the consumer device and proximity of the consumer device to the end user device. The proximity is determined by the cloud service provider system based on the location information transmitted.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 7 is a table of an example embodiment of stake holders, their potential investment, and their potential return on investment (ROI) based on an employing an example embodiment disclosed herein.

FIG. 12 is a block diagram of an example internal structure of a computer optionally within an embodiment disclosed herein.

DETAILED DESCRIPTION

Figure 1:
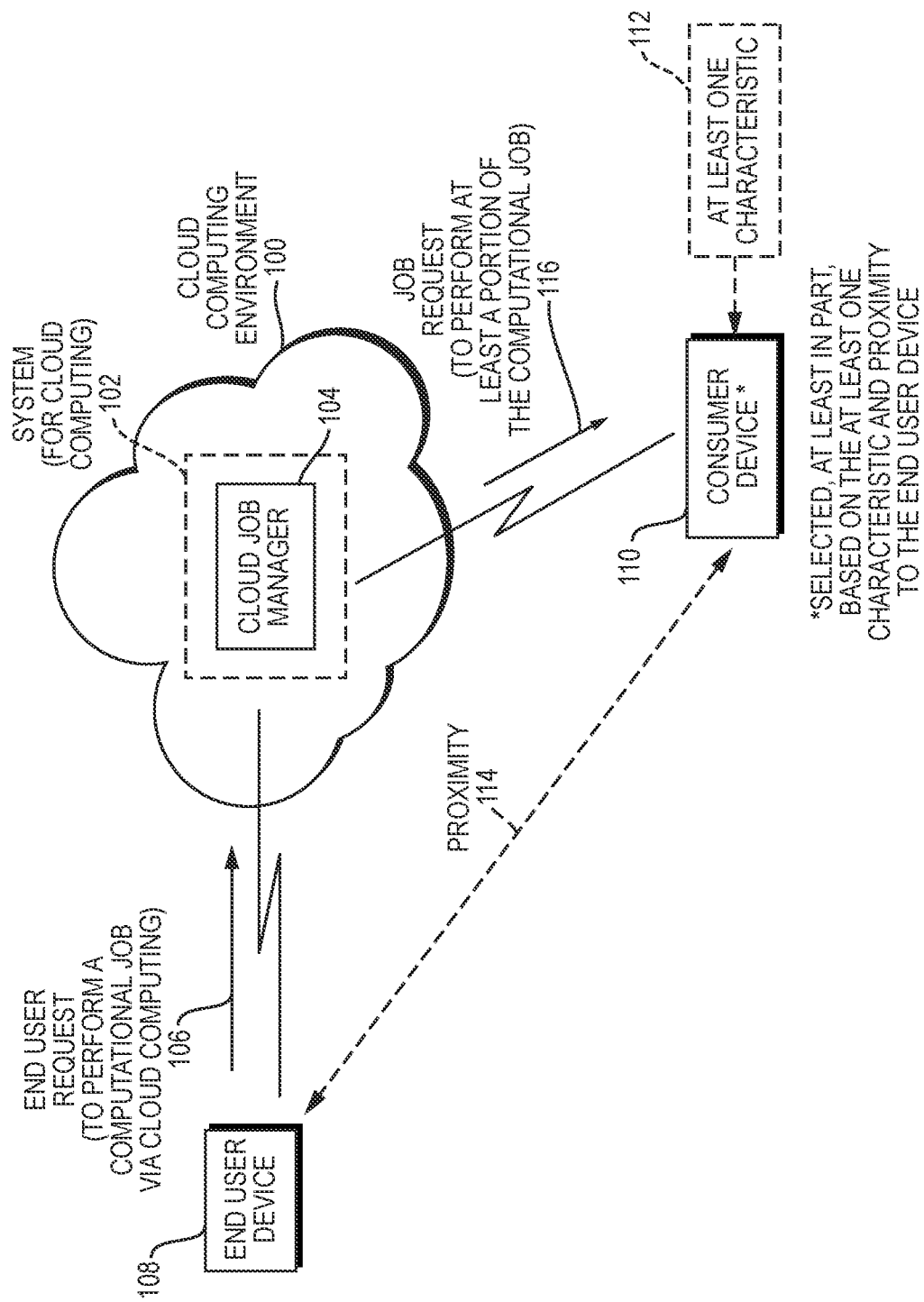
FIG. 1 is a block diagram of an example embodiment of a system for cloud computing.

A description of example embodiments follows.

Cloud computing refers to the distributed processing and storage over a network, where an application or a program is executed on multiple computers coupled in an arrangement. Though the processing and storage may be implemented on different computing and storage resources that may be geographically far apart, the processing and storage appears to a user, that is, an end user, as if implemented at one end point, which is loosely defined as the "cloud," and such an implementation is referred to as "cloud computing." Cloud computing is advantageous because it facilitates the use of resources only when required and, thus, increases the possibility of resource sharing.

Cloud computing enables spontaneous scaling of resources according to demand and its "pay as you go" model helps fluctuating and unpredictable businesses. Cloud computing has further advantages in that it enables a cloud user, referred to herein as an "end" user, to avoid upfront infrastructure cost and to further avoid information technology (IT) management and maintenance.

Logically, cloud services can be abstracted into three different layers—an infrastructure, platform, and application layer. The infrastructure layer includes the hardware resources required for providing a cloud service, such as computers, storage, and network resources for non-limiting example. The platform layer provides the computing environment that includes an operating system (OS), database, web servers, etc., for non-limiting example, which are typically tweaked (e.g., customized) for cloud computing. The application layer includes software and services which execute in the cloud computing environment of a cloud service provider.

In a typical cloud computing industry operational process, end users, who wish to develop their own applications on the cloud, contact one of the many cloud service providers, also referred to herein as cloud infrastructure providers, such as Amazon, Microsoft, IBM, etc., to hire their infrastructure (i.e., cloud platform), develop application(s) based on the hired cloud platform, and then deploy such application for use. These infrastructures are not dedicated resources per end user. An end user is not aware of the resources that are deployed for their use. Such deployed resources may change dynamically, which may not affect the end user's execution and the end user is not aware of same. The end user is charged by the cloud service provider for cloud resource and platform usage, at the end of a defined tenure.

On the other hand, cloud software/service providers either have their own infrastructure or hire from other cloud infrastructure providers as mentioned above, to develop and deploy software, and provide software as a service (SaaS) to the end user. Examples of such cloud software/service providers are enterprise resource planning (ERP) providers and customer relationship management (CRM) software providers, such as Salesforce. The end user, in this case, is also not aware of such infrastructure deployment and can use the software unhindered. Even in this case, the end user pays the cloud software provider a price depending on usage parameters, at the end of a defined tenure.

It is a cloud service provider's responsibility to ensure that there are enough computing resources at any time for executing the end user's application. It is also the cloud service provider's responsibility to ensure that the end user has the required platform that can deploy the infrastructure resources needed by the end user. It is further the cloud service provider's responsibility to delegate the end user's processing request to the right infrastructure, maintain the established infrastructure to provide low downtime, build additional infrastructure to address the scaling needs of the end user, and to provide monitoring and dashboard support for end users.

An example embodiment disclosed herein advantageously utilizes widely available private, low-power computing resources for cloud computing, such as smart phones for non-limiting example. Smart phone users continue to increase rapidly in number. It is estimated that there will be 5.5 billion mobile phones by 2022, 90% of which will be smart phones (Robert Williams; "Forrester: Global mobile users to exceed 5.5B by 2022;" published Jul. 18, 2017). An example embodiment disclosed herein employs private, consumer devices, such as high end smart phones and tablets for non-limiting example, for use as computing resources in cloud computing.

According to an example embodiment, the owners of the consumer devices, such as smart phones for non-limiting example, can subscribe with the cloud infrastructure service providers, to lend their consumer devices (e.g., smart phones, tablets, laptop computers, desktop computers, or other portable or non-portable programmable consumer electronic devices capable of computation as well as receiving and sending data via a network) to supplement the infrastructure network of a cloud service provider for use as a cloud computing resource. The cloud service provider, in return, shares a portion of profit, realized for using the consumer device, with the lender of the consumer device. The portion of the profit may be shared in any suitable manner, such as a reduced bill or monetary amount paid to the lender. As such, an example embodiment leverages the mostly unutilized power of dual core, quad core and octa core processing capabilities of consumer devices, such as smart phones for non-limiting example, that continue to be manufactured with increasing random-access memory (RAM) capacity.

Conventionally, cloud service providers rely on their massive establishment of computers for processing. These have multiple inherent disadvantages, which can be overcome via an example embodiment disclosed herein. For non-limiting example:

Conventionally, the cloud infrastructure includes massive, high-end computers and servers grouped under one roof at different geographic locations. Such high-end computers and servers consume very high power and require large cooling equipment. An example embodiment may employ a plurality of consumer devices as cloud computing resources, such as low-power smart phones and/or tablets for non-limiting example, and the plurality of consumer devices may be distributed across geographic locations as a grid. As such, an example embodiment does not require large cooling equipment and contributes to making the cloud greener than today.

An example embodiment enables spontaneous scaling of the cloud processing infrastructure. Adding equipment to such infrastructure typically requires upfront installation cost. According to an example embodiment, however, as there is an enormous base of consumer devices, such as smart phones of users for non-limiting example, scaling of processing infrastructure becomes simple. It is always available, whether it is used or not.

Processing resources are typically available at different defined facilities of cloud service providers. Adding to the computing infrastructure typically results in related expenses, such as real estate cost, cooling equipment cost, and corresponding maintenance. Such related expenses are obviated by employing an example embodiment disclosed herein.

There have been cases in which an end user's application has been affected when a cloud service provider had to move its entire facility or when such facility experienced an electrical outage (Christophe C'erin et al.; "Downtime statistics of current cloud solutions;" June 2013 Update; Telecom ParisTech yGalileo Institute z, Institut Mines-Telecom ANDSI Alter Way Cedexis HSC Nexedi VIFIB DSI Groupe LaPoste). An example embodiment enables the hired processing to be distributed and multiple fallback options can be created using additional consumer devices to obviate any disruption to the end user's application.

Typically, cloud infrastructure providers spend a lot of money in maintaining their computing resources. According to an example embodiment, a consumer device, such as a smart phone for non-limiting example, is lent from the smart phone owner (i.e., the lender) and, thus, no maintenance cost is incurred by the cloud infrastructure provider to maintain the cloud computing resource.

Typically, the cloud infrastructure needs to be powered 'on' or in 'standby,' such that resources thereof are ready to handle end users' requests at any given the time. This adds to the cost of the cloud service providers power cost. An example embodiment employs consumer devices, such as smart phones for non-limiting example, which are powered on and ready for application execution, and the power usage of such consumer devices does not incur cost for the cloud service provider.

With the amount of processing infrastructure and storage equipment typically required for establishing a cloud service, only big giants, such as Amazon, IBM, Microsoft, Google, etc., who already have such facilities, can enter into this segment. By employing an example embodiment disclosed herein, however, since the computing infrastructure is hired by employing lender consumer device resources, the cloud infrastructure can be established at a reduced cost, enabling smaller entities, such as a university for non-limiting example, to enter into this segment.

On the other hand, the lenders of the consumer devices, such as smart phone users for non-limiting example, who do not utilize the entire processing capability of the processor(s) on the consumer device, can make some additional money by lending it to a cloud service provider for cloud computing.

Typically, the infrastructure deployed by one cloud service provider is shared among different applications hosted by such provider depending on the processing demand. By employing an example embodiment disclosed herein, however, a single consumer device, such as a smart phone for non-limiting example, can be lent to more than one cloud service provider. Depending on the processing capabilities of the single consumer device, more than one process from different cloud platforms can be serviced by the single consumer device. Hence, the processing infrastructure gets shared, not only with the cloud, but across the cloud, such as disclosed further below with regard to FIG. 5.

As the processing infrastructure is typically available only at defined locations, all the end users' requests have to be processed in any one of the cloud service provider's facilities at the defined locations. According to an example embodiment, however, as consumer devices, such as smart phones for non-limiting example, are available across numerous geographic locations, processing can be done at the closest available consumer device to the end user device, thus reducing the network usage for communications associated with such processing, such as disclosed below with regard to FIG. 1.

FIG. 1 is a block diagram of an example embodiment of a system 102 for cloud computing. The system 102 is in a cloud computing environment 100 of a cloud service provider, such as the cloud computing environment 200 of FIG. 2, disclosed below.

Figure 2:
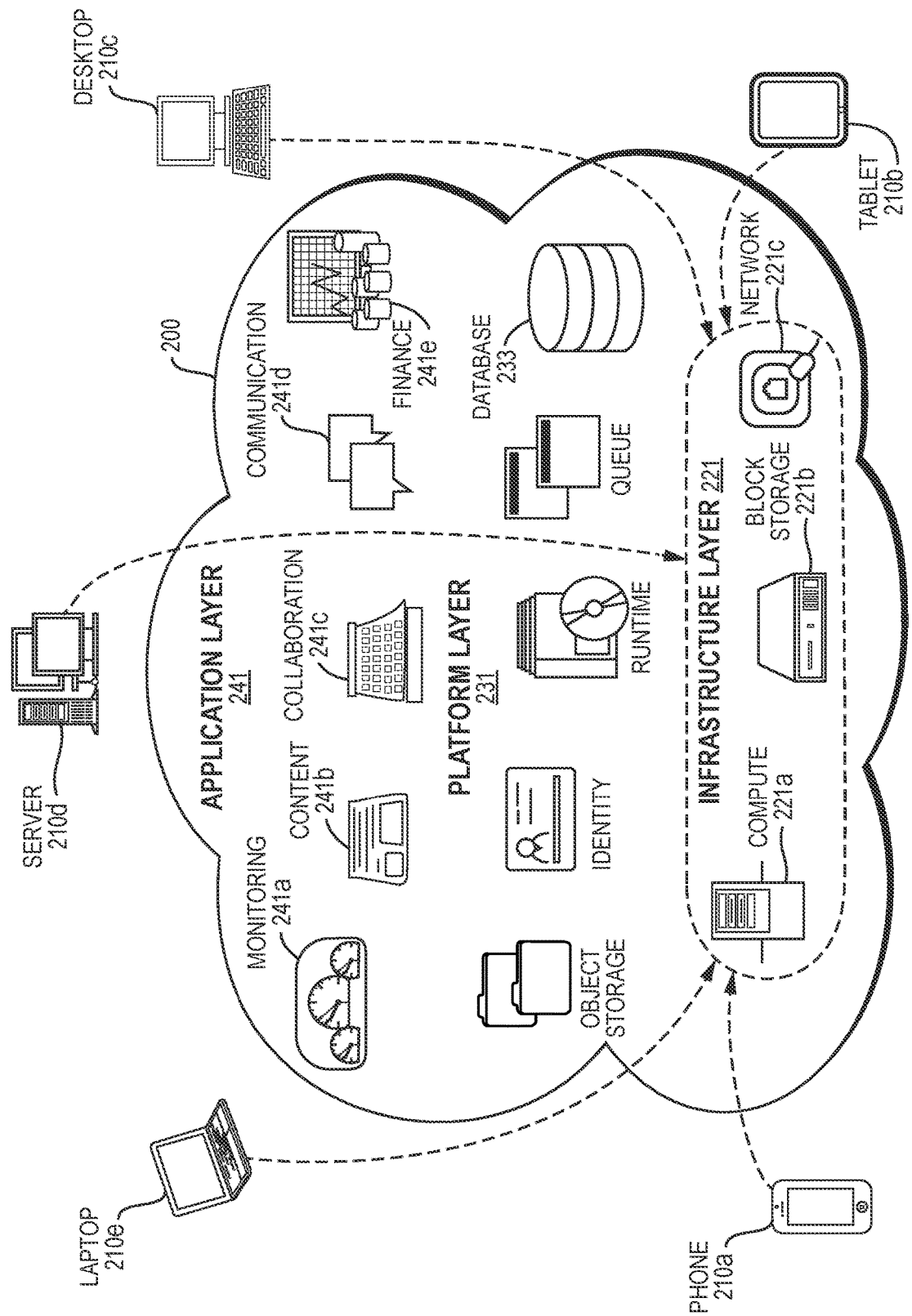
FIG. 2 is a block diagram of an example embodiment of a cloud computing environment.

FIG. 2 is a block diagram of an example embodiment of a cloud computing environment 200 of a cloud service provider (not shown). The cloud computing environment may be employed as the cloud computing environment 100 of FIG. 1, disclosed above. The cloud computing environment 200 includes an infrastructure layer 221, a platform layer 231, and an application layer 241. The infrastructure layer 221 includes the hardware resources required for providing a cloud service, such as computers 221*a*, storage 221*b*, and network resources 221*c* for non-limiting example. The platform layer 231 provides the computing environment that includes an operating system (OS) (not shown), database 233, web servers (not shown), etc., for non-limiting example, which are typically tweaked (e.g., customized) for cloud computing.

The application layer 241 includes software and services (241a, 241b, 241c, 241d, 241e) for non-limiting example, which execute in the cloud computing environment 200 of the cloud service provider. According to an example embodiment, the infrastructure layer 221 is supplemented by consumer devices, such as the smart phone 210a, tablet 210b, desktop computer 210c, server 210d, and laptop computer 210e for non-limiting example. Such consumer devices are under lease to supplement the infrastructure layer 221 in exchange for a portion of the respective profit realized based on usage of same, such as disclosed further below with regard to FIG. 1.

Referring back to FIG. 1, the system 102 in the cloud computing environment 100 comprises a cloud job manager 104 configured to manage an end user request 106 to perform a computational job (not shown) via cloud computing. The end user request 106 is received from an end user device 108. The cloud job manager 104 is further configured to manage the end user request 106 by selecting a consumer device 110 to perform at least a portion (not shown) of the computational job. The consumer device 110 selected may be a smart phone, tablet, laptop computer, desktop computer, or other portable or non-portable programmable consumer electronic device capable of computation as well as receiving and sending data via a network, for non-limiting example.

The consumer device 110 is selected, at least in part, based on at least one characteristic 112 of the consumer device 110 and proximity 114 of the consumer device 110 to the end user device 108. The cloud job manager 104 is further configured to manage the end user request 106 by assigning the at least a portion of the computational job to the consumer device 110 selected by transmitting a job request 116 to perform the at least a portion of the computational job. The job request 116 is transmitted to the consumer device selected. The cloud job manager 104 may select the consumer device 110 based on matching a given type of compute processing of the at least a portion of the computational job to a type of resource of the consumer device 110, wherein the type of resource is known to be capable of performing the given type of compute processing.

The consumer device 110 may be selected from among a plurality of consumer devices (not shown) that are under lease agreement for use by the system 102. The consumer device 110 selected meets respective criterion for the at least one characteristic 112 and is geographically located closest to the end user device 108 relative to any other consumer device of the plurality of consumer devices meeting the respective criterion. The respective criterion may include availability of the consumer device, availability of a particular resource on the consumer device, battery health, processor load, etc., or combination thereof, for non-limiting example.

The consumer device 110 is closest as indicated by the proximity 114 that may be computed by the cloud job manager 104 based on respective location information received from the end user device 108 and the consumer device 110. As such, along with other cost benefits to the cloud service provider (also referred to interchangeably herein as a cloud provider) of the system 102, such as summarized above and in table 700 of FIG. 7, disclosed further below, a networking bill of the cloud provider can be reduced by employing the consumer device 110 instead of relying solely on resource(s) from its infrastructure facility to perform the at least a portion of the computational job of the end user request 106.

The system 102 may be a cloud service provider system of a cloud service provider (not shown). The consumer device 102 selected may be a low-power computing device, lower in power usage relative to other computing devices available to the cloud service provider for use as a resource for cloud computing, such as the computing resources of the infrastructure layer 221 of FIG. 2, disclosed above, for non-limiting example.

Referring back to FIG. 1, the at least one characteristic 112 may include, for non-limiting example, device health information, device capability information, or a combination thereof. The device health information may include, for non-limiting example, resource utilization, battery power available, battery health, processor load, user application prioritization, data network speed, virtual machine (VM) availability, type of network connectivity, load sharing, device availability information derived from a user profile associated with the consumer device, or a combination thereof. The user profile may include settings, such as a do-not-disturb on/off setting, a timetable defining when the consumer device may be employed for cloud computing, etc., or combination thereof, for non-limiting example. The device capability information may include processor capability, storage capability, estimate for battery drain over time, other capability information derived from a make and model of the consumer device, or a combination thereof, for non-limiting example.

The cloud job manager 104 may be further configured to compute a profit estimate (not shown) that is determined to be effected by use of the consumer device 110 for performing the at least a portion of the computational job. The cloud job manager 104 may be further configured to select the consumer device 110 based on the profit estimate computed. The cloud job manager 104 may be further configured to compute a compensation amount (not shown) to be paid for use of the consumer device 110. The compensation amount may be computed based on the profit estimate determined. The cloud job manager 104 may be further configured to select the consumer device 110 based on the compensation amount computed.

The cloud job manager 104 may be coupled to the consumer device 110 via a communications channel, such as the communications channel 542 of FIG. 5, disclosed further below. To assign the at least a portion of the computational job to the consumer device 110 selected, the cloud job manager 104 may be further configured to communicate, over the communications channel, with a client job manager of the consumer device selected, such as the client job manager 320 of FIG. 3, disclosed further below. The client job manager may be configured to spawn at least one processing task on the consumer device 110 selected, such as the processing task 322 disclosed further below with regard to FIG. 3. The at least one processing task may be configured to perform the at least a portion of the computational job.

The cloud job manager 104 may be further configured to assign a job identifier (ID) (not shown) to the computational job. The cloud job manager 104 may be further configured to assign a sub-job ID (not shown) to the at least a portion of the computational job. The sub-job ID may be associated with the job ID. The cloud job manager 104 may be further configured to associate the sub job ID with a device ID (not shown) associated with the consumer device 110 selected, track progress of the computational job, and associate an indicator (not shown) of the progress tracked with the job ID.

The system may further comprise a data handler and data storage, such as the data handler (546a, 546b) and data storage (547a, 547b) disclosed further below with regard to FIG. 5. The data handler may be coupled to the data storage and further coupled to the cloud job manager 104. The data handler may be configured to fetch data, corresponding to the sub job ID, from the data storage and forward the data fetched to the cloud job manager 104. The cloud job manager 104 may be further configured to transmit the data fetched to the consumer device selected. Such data (not shown) may be included with the job request 116 or transmitted separate from the job request 116. The data may be transmitted with the job ID, sub-job ID, or a combination thereof.

The system 102 may further comprise an application layer and a platform layer, such as disclosed further below with regard to FIG. 5. The platform layer may be coupled to the application layer and the cloud job manager 104. The computational job may be a given computational job among a plurality of computational jobs delegated by the platform layer to the cloud job manager 104 for assigning to consumer devices, such as the consumer device 110 selected.

The cloud job manager 104 may be further configured to assign identifiers (IDs) to track a) assignment of the plurality of computational jobs to respective consumer devices, the respective consumer devices including the consumer device 110 selected, b) which computational jobs of the plurality of computational jobs are split into respective multiple smaller computational jobs, the respective multiple smaller computational jobs assigned for processing in different or same consumer devices, c) which computational jobs of the plurality of computational jobs are in progress, and d) which computational jobs of the plurality of computational jobs are queued for assignment to respective consumer devices.

The cloud job manager 104 may be further configured to monitor the proximity 114 of the consumer device 110 selected to the end user device 108, monitor health of the consumer device 110 selected, and determine whether to offload the at least a portion of the computational job from the consumer device 110 selected to another consumer device (not shown) based on the proximity 114 and health monitored.

To monitor the proximity 114 and health of the consumer device 110 selected, the cloud job manager 104 may be further configured to communicate over a communications channel with a client job manager of the consumer device 110 selected, such as the client job manager 320 disclosed further below with regard to FIG. 3. The health of the consumer device 110 may include battery health, processor load, user application prioritization, data network speed, availability of a virtual machine, Wireless Fidelity (Wi-Fi) or data network status, or a combination thereof, for non-limiting example.

The cloud job manager 104 may be further configured to determine an amount of time for completing the at least a portion of the computational job and to select the consumer device 110 based on a determination that the consumer device 110 is capable of completing the at least a portion of the computational job in the time determined. The determination may be based on movement of the consumer device 110, likelihood of call drops of a communications channel for communicating with the consumer device 110, availability of battery power of the consumer device 110, an estimate of time for the consumer device 110 to complete the at least a portion of the computational job, an estimate of battery usage by the consumer device 110 to complete the at least a portion of the computational job, or a combination thereof, for non-limiting example.

The system 102 may further comprise an information database (not shown). The information database may be created by the system 102 during operation of the system 102. The information database may include per-make-and-model battery characteristics of the consumer device 110. The cloud job manager 104 may be further configured to compute the estimate of battery usage based on the per-make-and-model battery characteristics of the consumer device 110.

The cloud job manager 104 may be further configured to track usage parameter(s) (not shown) associated with implementing the computational job. The usage parameters may include, for non-limiting example, per-device processor usage time used by the consumer device 110 selected to perform the at least a portion of the computational job, per-process processor usage time used per-process executing on the consumer device 110 selected to perform the at least a portion of the computational job, data network usage, or a combination thereof.

The cloud job manager 104 may be further configured to communicate in a secure manner with a client job manager of the consumer device 110 selected, such as the client job manager 320 of FIG. 3, disclosed further below. The secure manner may include splitting data communicated therebetween into multiple sequences with respective sequence ID values assigned thereto and applying an encryption method to the multiple sequences. Such an encryption method may be any encryption method known in the art. The cloud job manager 104 and client job manager may form a pairing of job managers and the encryption method may be limited to interpretation by the job managers in the pairing.

The cloud job manager 110 may be further configured to communicate with the client job manager, of the consumer device 110 selected, to install a virtual operating system (OS) on the consumer device 110 selected. To perform the at least a portion of the computational job, the client job manager may be configured to spawn at least one first process on the virtual OS installed, spawn at least one second process on a native OS on the consumer device, or a combination thereof. An example embodiment of the client job manager is disclosed below with regard to FIG. 3.

Figure 3:
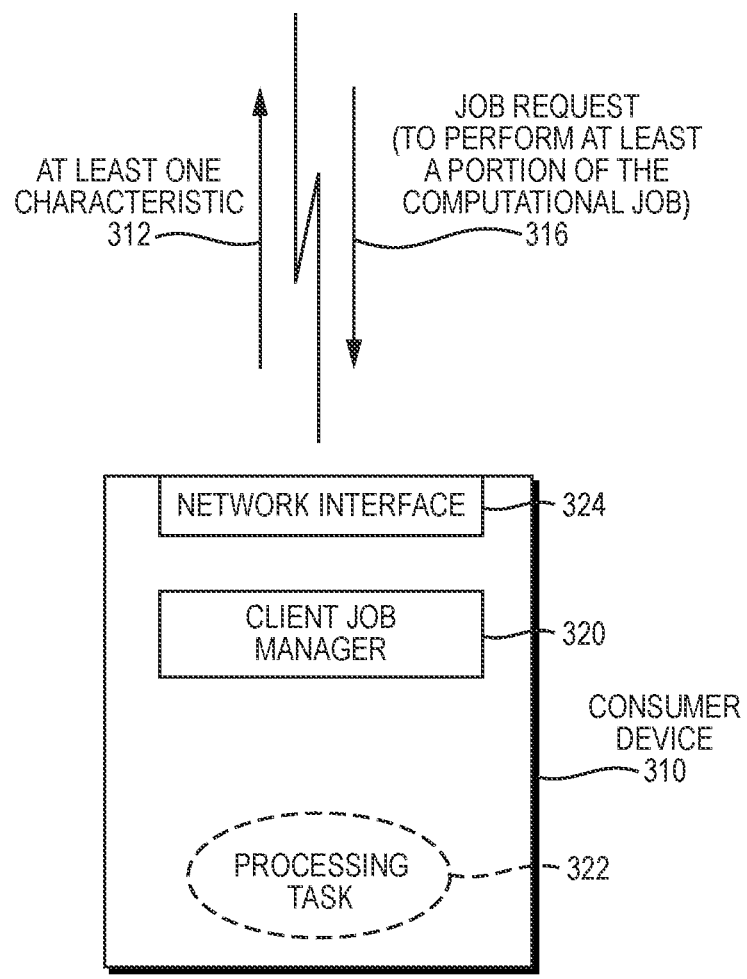
FIG. 3 is a block diagram of an example embodiment of a consumer device.

FIG. 3 is a block diagram of an example embodiment a consumer device 310. The consumer device 310 may be employed as the consumer device 110 of FIG. 1, disclosed above, or as a consumer device of any example embodiment disclosed herein. The consumer device 310 comprises a client job manager 320 configured to spawn a processing task 322 on the consumer device 310 responsive to a job request 316 to perform at least a portion of a computational job (not shown). The computational job is requested by an end user device, such as the end user device 108 of FIG. 1, disclosed above, and is requested by the end device to be performed via cloud computing. The consumer device 310 further comprises a network interface 324. The network interface 324 may be any network interface known in the art that enables the consumer device 310 to transmit and received data over a network, such as a local area network (LAN), wide area network (WAN), cellular network (2G, 3G, 4G, LTE, 5G, etc.), or any other wired network, wireless network, or combination thereof, for non-limiting example.

The job request 316 is received via the network interface 324 from a cloud job manager of a cloud service provider system of a cloud service provider, such as the cloud job manager 104 of FIG. 1, disclosed above. The processing task 322 is configured to perform the at least a portion of the computational job. The consumer device 310 is selected by the cloud job manager based, at least in part, on proximity of the consumer device 310 to the end user device and at least one characteristic 312 of the consumer device 310. The client job manager 320 is further configured to communicate the at least one characteristic 312 to the cloud job manager via the network interface 324. The consumer device may be a smart phone, tablet, laptop computer, desktop computer, or other portable or non-portable programmable consumer electronic device capable of computation as well as receiving and sending data via a network for non-limiting example.

The job request 316 may be received with a corresponding identifier (not shown) and data (not shown). The client job manager 320 may be further configured to associate the corresponding identifier received with the processing task spawned. The processing task 322 spawned may be configured to employ the data to perform the at least a portion of the computational job. The client job manager 320 may be further configured to track the processing task 322 spawned and notify the cloud job manager via the network interface 324 of completion of the at least a portion of the computational job. As such, a respective cloud job manager, such as the cloud job manager 104 of FIG. 1, disclosed above, and the client job manager 320 may handshake, communicatively, over the network interface 324 to enable the at least a portion of the computational job to be completed. In an event the at least a portion of the job cannot be started or completed as determined by client job manager 320 of the consumer device 310, the client job manager 320 may inform the respective cloud job manager of same via the network interface 324. The client job manager 320 may be further configured to track the processing task 322 spawned and transmit, via the network interface 324, information (not shown), collected from the processing task 322 spawned, to the cloud job manager or a data handler coupled to the cloud job manager, such as the data handler of FIG. 5, disclosed further below.

The client job manager 320 may be a given client job manager of a plurality of client job managers of the consumer device 320, such as the plurality of client job managers of the consumer device 510a of FIG. 5, disclosed further below. The given client job manager, that is, the client job manager 320, may be configured to employ security measures to ensure that data integrity of data associated with the at least a portion of the computational job is maintained, such that another client job manager of the plurality of client job managers or another process of the consumer device 310 does not interfere with, tamper with, or capture data associated with the at least a portion of the computational job.

The consumer device 310 may further comprise a processor, such as the processor 1266 of FIG. 12, disclosed further below. The client job manager 320 may be further configured to track usage parameter(s) (not shown) that are associated with implementing the at least a portion of the computational job. The usage parameter(s) may include, for non-limiting example, total usage time of the processor, per-process usage time of the processor, data network usage, or a combination thereof.

The at least one characteristic 312 may include, for non-limiting example, device health information, device capability information, or a combination thereof. The device health information may include, for non-limiting example, resource utilization, battery power available, battery health, processor load, user application prioritization, data network speed, virtual machine (VM) availability, type of network connectivity, load sharing, device availability information derived from a user profile (not shown) associated with the consumer device 310, or a combination thereof for non-limiting example. The device capability information may include processor capability, storage capability, estimate for battery drain over time, other capability information derived from a make and model of the consumer device, or a combination thereof, for non-limiting example. The consumer device 310 may further comprise at least one subsystem, such as at least one subsystem of the subsystems 551a or 551b disclosed further below with regard to FIG. 5. The at least one characteristic 312 may be obtained by the client job manager 320 from the at least one subsystem.

The client job manager 320 may be further configured to communicate in a secure manner with the cloud job manager over the network interface 324. The secure manner may include splitting data communicated therebetween into multiple sequences with respective sequence ID values assigned thereto and applying an encryption method to the multiple sequences. The cloud job manager and client job manager 320 may form a pairing of job managers and the encryption method may be limited to interpretation by the job managers in the pairing. The encryption method may be any encryption method known in the art.

Figure 4:
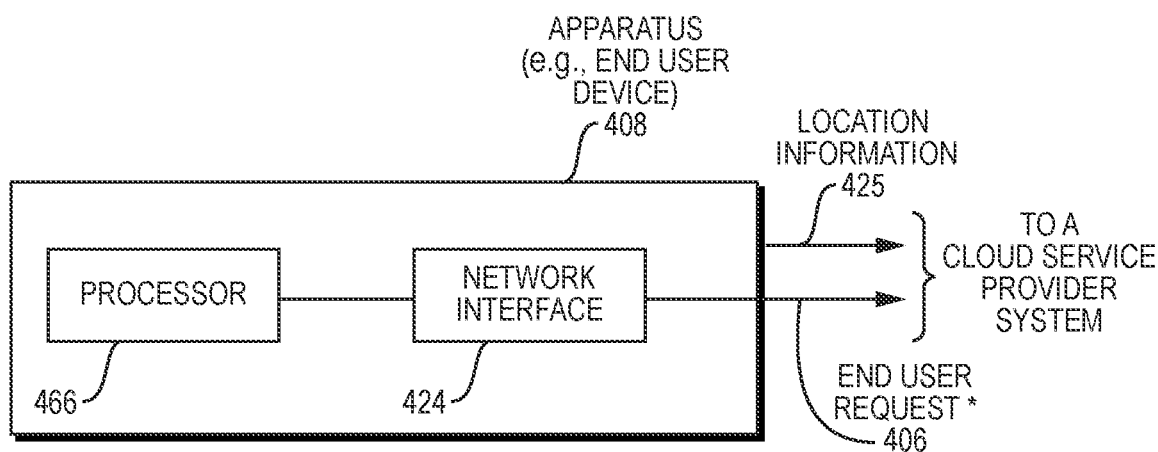
FIG. 4 is a block diagram of an example embodiment of an apparatus.

As disclosed above, the processing task 322 executing on the consumer device 310 may be configured to perform at least a portion of the computational job requested by an end user device to be performed via cloud computing. FIG. 4, disclosed below, describes an example embodiment of an apparatus 408 that may be employed as such an end user device.

FIG. 4 is a block diagram of an example embodiment of an apparatus 408 that may be employed as an end user device disclosed herein, such as the end user device 108 of FIG. 1, disclosed above. The apparatus 408 may be a smart phone, tablet, laptop computer, desktop computer, or other portable or non-portable programmable consumer electronic device capable of computation as well as receiving and sending data via a network for non-limiting example.

The apparatus 408 comprises a network interface 424 and a processor 466 coupled to the network interface 424. The processor 466 is configured to transmit, via the network interface 424, an end user request 406 to a cloud service provider system of a cloud service provider, such as the system 102 of FIG. 1, disclosed above. The processor 466 is further configured to transmit, via the network interface 424, location information 425 of the apparatus 408 to the cloud service provider system. The end user request 406 is for performing a computational job (not shown) via cloud computing.

At least a portion of the computational job is assigned to a consumer device selected by the cloud service provider system, such as the consumer device 110 of FIG. 1, disclosed above. The consumer device is selected, at least in part, based on at least one characteristic of the consumer device and proximity of the consumer device to the apparatus 408. With reference to FIG. 1 and FIG. 4, the proximity 114 may be determined by the system 102 based on the location information 425 transmitted by the apparatus 408 and respective location information (not shown) that may be transmitted from the consumer device 110. Further example embodiments of the consumer device 110 are disclosed below with regard to FIG. 5.

Figure 5:
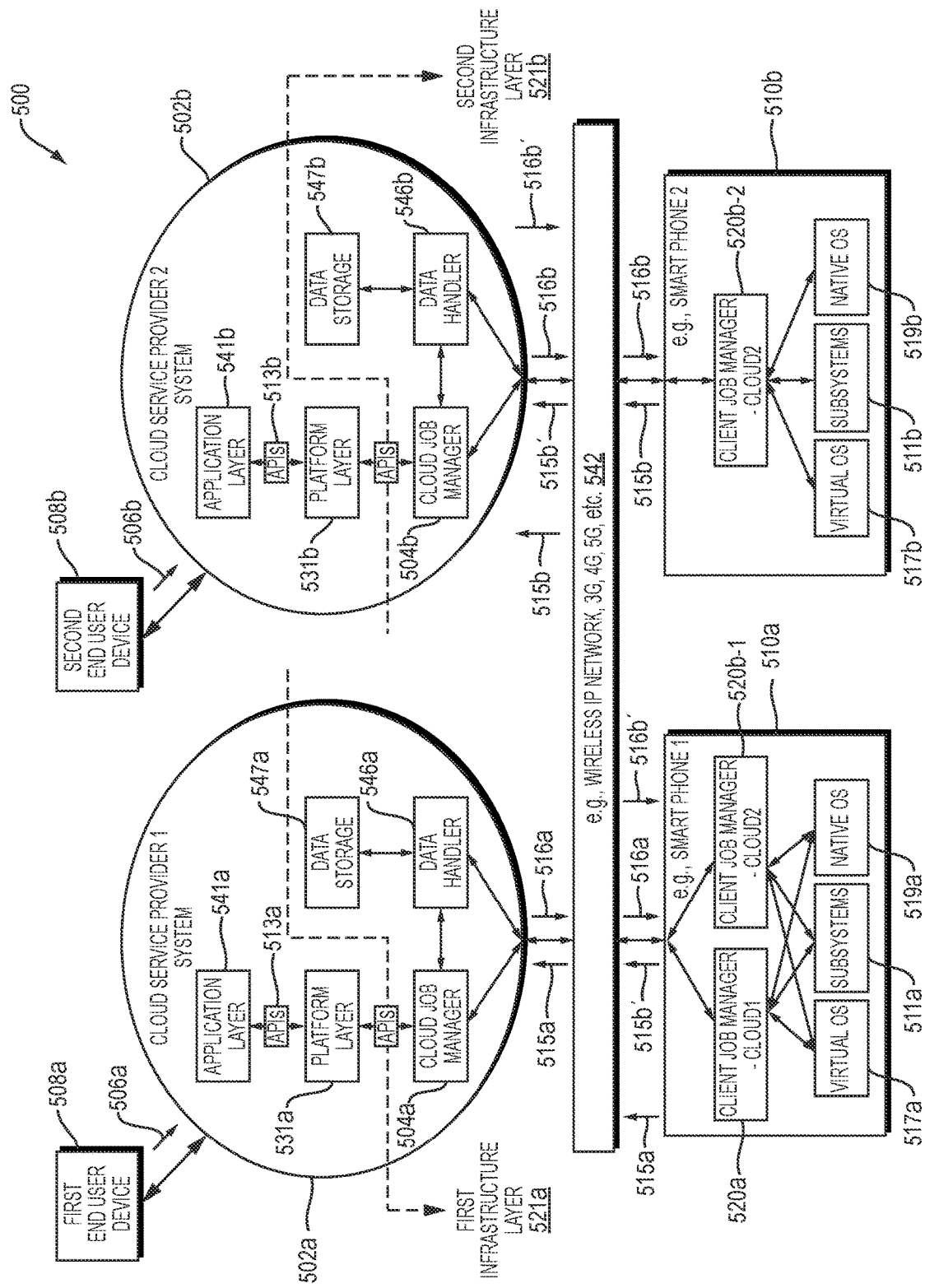
FIG. 5 is a block diagram of another example embodiment of a cloud computing environment.

FIG. 5 is a block diagram of an example embodiment of a cloud computing environment 500. The cloud computing environment 500 includes a first cloud service provider system 502a and a second cloud service provider system 502b. The first cloud service provider system 502a or the second cloud service provider system 502b may be employed as the system 102 of FIG. 1, disclosed above.

The first cloud service provider system 502a includes a first application layer 541a, platform layer 531a, first cloud job manager 504a, first data storage 547a, and first data handler 546a. Similarly, the second cloud service provider system 502a includes a second application layer 541a, second platform layer 531a, second cloud job manager 504a, second data storage 547a, and second data handler 546a. The first cloud job manager 504a or second cloud job manager 504b may be configured such as the cloud job manager 104 of FIG. 1, disclosed above The first application layer 541a and second application layer 541b host end users' applications, such as may be requested by the first end user device 508a or second end user device 508b, respectively. Such layer remains more or less the same, as compared to conventional cloud implementation. A respective application from such layer calls the relevant application specific interfaces (APIs) to interface with the respective platform layer (531a, 531b) as is known in the art.

The first platform layer 531a interfaces between the first application layer 541a and a first infrastructure layer 521a of the first cloud provider system 502a. The second platform layer 531b interfaces between the second application layer 541b and a second infrastructure layer 521b of the second cloud provider system 502b. The first infrastructure layer 521a and second infrastructure layer 521b include respective resources of the first cloud provider system 502a and second cloud provider system 502b, respectively, as is known in the art as disclosed above with regard to FIG. 2.

In the example embodiment of FIG. 5, however, such respective resources can be supplemented by consumer devices, such as the first consumer device 510a and second consumer device 510b, respectively. As such, respective controllers (not shown) of the first platform layer 531a and second platform layer 531b differ from conventional controllers of platform layers as such controllers are modified to be able to delegate at least a portion of computational jobs of end user requests, such as respective computational jobs of the first end user request 506a or second end user request 506b, depending on whether the respective requested computation thereof can be performed, for example at lower cost, using a private, consumer device(s) of a lender(s), such as a smart phone or other consumer device disclosed herein, that may be allocated for use by a respective cloud service provider to supplement resources of such cloud service provider system, such as the first cloud provider system 502a or second cloud provider system 502b.

As such, respective controller (not shown) of the first platform layer 531a or second platform layer 531b may be configured to delegate at least of portion of a computational job requested via the first end user request 506a or second end user request 506b to a resource(s) that may include the first consumer device 510a and/or second consumer device 510b. According to an example embodiment, respective controllers of the first platform layer 531 and second platform layer 531b may employ the first cloud job manager 504a or second cloud job manager 504b, respectively, to get the computational job done.

For example, the respective controller of the first platform layer 531a may delegate at least a portion of a first computational job (not shown) of the first end user request 506a to the first cloud job manager 504a. Similarly, the respective controller of the second platform layer 531b may delegate at least a portion of a second computational job (not shown) of the second end user request 506b to the second cloud job manager 504b.

In the example embodiment of FIG. 5, there are two job managers who are paired and hand shake with each other to get the job accomplished in an event the at least a portion of the computational job is to be handled by a consumer device. The two job managers include a respective cloud job manager of given cloud service provider system and a respective client job manager of a consumer device, such as the cloud job manager 104 and client job manager 320 disclose above with regard to FIG. 1 and FIG. 3, respectively.

In the paring of job managers, a cloud job manager (504a, 504b) delegates the job from the platform layer (531a, 531b). The other job manager, which is available in the consumer device, such as a smart phone for non-limiting example, is considered the "client" job manager. The cloud job manager, such as the first cloud job manager 504a or second cloud job manager 504b, interfaces with a consumer device, such as the first consumer device 510a or second consumer device 510b, and further interfaces with a respective data handler, such as the first data handler 546a or second data handler 546b, respectively.

According to an example embodiment, the cloud job manager (5104a, 504b) may assign IDs to identify jobs in order to track, for non-limiting example, which job is delegated to which consumer device (510a, 510b), which job is being split into multiple smaller jobs and processed in different consumer devices (510a, 510b), which jobs are in progress, which are queued etc. This job ID (not shown) may also be communicated to the data handler (546a, 546b), to fetch the corresponding data from data storage (547a, 547b) to be sent to the consumer device (510a, 510b), if required.

According to an example embodiment, the cloud job manager (504a, 504b) may be configured to monitor different aspects related to delegation of a job—such as keeping tabs on the proximity of the consumer device (510a, 510b) to the end user device (508a, 508b), health of the consumer device (e.g., battery health, CPU load, user application prioritization, data network speed, available VMs, proximity of the phone, whether the consumer device is on Wi-Fi or data network, etc.), load sharing, etc., or combination thereof, for non-limiting example. According to an example embodiment, the cloud job manager (504a, 504b) layer may be configured to predict whether it is possible to get a job completed if assigned to a specific consumer device (510a, 510b) depending on various factors, such as the movement of the consumer device, the possibility of call drops, the available battery power, the estimate of the time required to complete a job, etc., or combination thereof, for non-limiting example.

The client job manager (520a, 520b-1, 520b-2) assists the respective cloud job manager (504a, 504b) from the respective consumer device (510a, 510b). The client job manager (520a, 520b-1, 520b-2) may receive the respective job request (516a, 516b, 516b') with a respective ID and corresponding data (not shown), and spawn a new processing task (not shown) on the lower layers (not shown) in the consumer device (510a, 510b). The client job manager (520a, 520b-1, 520b-2) may keep track of the spawned jobs, collecting and providing required information (515a, 515b, 515b) to the appropriate cloud job manager (504a, 504b) and the data handler (546a, 546b), paired thereto, at various times (e.g., periodically or intermittently).

The client job manager (520a, 520b-1, 520b-2) may collect and furnish health information disclosed herein which may be obtained for non-limiting example, at least in part, from respective different subsystems (511a, 511b) of the respective consumer device (510a, 510b). Such subsystems may be any subsystem, such as a location sensor subsystem or other subsystem, known in the art to be included in an electronic subsystem of a consumer device.

According to an example embodiment, there can be more than one client job manager executing on a consumer device allocated for use by a cloud provider system(s), such as the first client job manager 520a and second client job manager 520b-1 on the first consumer device 510a, making it feasible for a single consumer device to be lent to more than one cloud service provider. The client job managers (520a, 520-b-1, 520b-2) may be built with enough security measures and data integrity, such that an irrelevant (e.g., non-paired) client job manager or any other process does not interfere with, tamper with, or capture data associated with job managers in a cloud-job-manager to client-job-manager pairing. According to an example embodiment, both job managers in the loud-job-manager to client-job-manager pairing may keep track of usage parameters—such as CPU usage time per phone, per process, data network usage, etc., for non-limiting example, that may be used for billing, contract, and dashboards use.

According to an example embodiment, a communications channel 542 between the cloud platform, that is, the respective cloud service provider system (502a, 502b) and a consumer device (510a, 510b) is the Internet made available through mobile service providers of 3G, 4G, 5G networks or Wi-Fi networks for non-limiting example. According to an example embodiment, an encrypted secure channel may be built to ensure data integrity over the communications channel 542.

According to an example embodiment, respective processes (not shown) spawned on a respective consumer device (510a, 510b) to perform at least a portion of a computational job delegated to the respective device by a cloud service provider system (502a, 502b) may be spawned on a native OS (519a, 519b) or virtual OS (517a, 517b) in the respective consumer device (510a, 510b).

As such, with reference to FIG. 1, FIG. 3, and FIG. 5, the cloud service provider system 102 may be a first cloud service provider system 502a of a first cloud service provider (not shown). The client job manager 320 may be a first client job manager 520a, the processing task 322 may be a first processing task (not shown), the job request 316 may be a first job request 516a, the computational job (not shown) may be a first computational job (not shown), and the end user device 108 may be a first end user device 508a. The first computational job may be requested by the first end user device 508a to be performed via cloud computing of the first cloud service provider.

The consumer device 110 may further comprise a second client job manager 520b-1. The second client job manager 520b-1 may be configured to spawn a second processing task (not shown) on the consumer device 110 responsive to a second job request 516b' to perform at least a portion of a second computational job (not shown). The second computational job may be requested by a second end user device 508b to be performed via cloud computing of a second cloud service provider (not shown).

The second job request 516b' may be received from a second cloud job manager 504b via the network interface 324 from a second cloud service provider system 502b of the second cloud service provider. The second processing task may be configured to perform the at least a portion of the second computational job. The consumer device 110 may be selected by the second cloud job manager 504b based, at least in part, on proximity of the consumer device 110 to the second end user device 508b and the at least one characteristic 112 of the consumer device 110. The second client job manager 520b-1 may be further configured to communicate the at least one characteristic 112 to the second cloud job manager 504b via the network interface 324.

According to an example embodiment, the cloud job manager 104, first cloud job manager 504a, and second cloud job manager 504b may be implemented in a liaison system instead of the cloud provider system 102, first cloud provider system 502a, and second cloud provider system 502b, respectively. Such a liaison system is disclosed below, with regard to FIG. 6.

Figure 6:
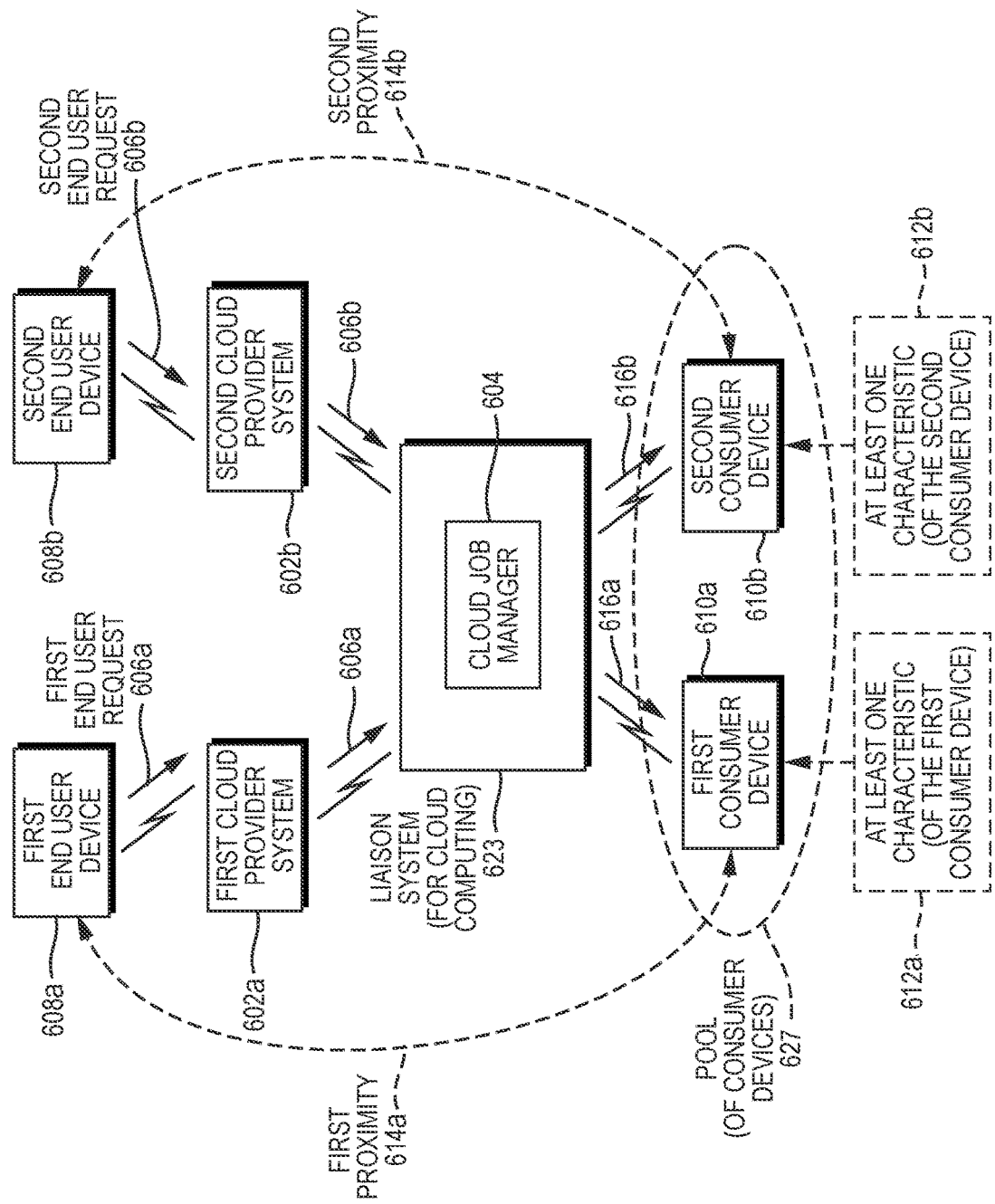
FIG. 6 is a block diagram of an example embodiment of a liaison system for cloud computing.

FIG. 6 is a block diagram of an example embodiment of a liaison system 623 for cloud computing. Implementation of the liaison system 623 enables a new ecosystem of cloud computing as disclosed herein. The ecosystem enables consumer devices to be shared among different cloud service providers by including a cloud job manager 604 that interfaces with, for example, respective controllers of platform layers of cloud service provider systems and, as such, may serve as a common cloud job manager that can gather intelligence of attributes and state of consumer devices allocated for use by such subscribers and handle jobs delegated from the cloud service provider systems to such consumer devices. The liaison system 623 comprises a cloud job manager 604 coupled to a first cloud service provider system 602a, a second cloud service provider system 602b, and a pool 627 of consumer devices. The consumer devices in the pool 627, such as the first consumer device 610a and second consumer device 610b, are allocated for use by the liaison system 623 for cloud computing. The cloud job manager 604 is configured to manage a first end user request 606a sent from a first end user device 608a to the first cloud service provider system 602a to perform a first computational job (not shown) via cloud computing.

To manage the first end user request 606a, the cloud job manager 604 is further configured to select the first consumer device 610a to perform at least a portion of the first computational job and assign the at least a portion of the first computational job to the first consumer device 610a selected, for example, by transmitting a first job request 616a to the first consumer device 610a. The cloud job manager 604 is further configured to manage a second end user request 606b sent from a second end user device 608b to the second cloud service provider system 602b to perform a second computational job (not shown) via cloud computing.

To manage the second end user request 606b, the cloud job manager 604 is further configured to select the second consumer device 610b to perform at least a portion of the second computational job and assign the at least a portion of the second computational job to the second consumer device 610b selected. The first consumer device 610a and second consumer device 610b may be different or same consumer devices from the pool 627 of consumer devices.

The first consumer device 610a may be selected, at least in part, based on at least one characteristic 612a of the first consumer device 610a and a first proximity 614a of the first consumer device 610a to the first end user device 608a. The at least one characteristic 612a of the first consumer device 610a may include device health information, device capability information, or a combination thereof, for non-limiting example. The device health information may include resource utilization, battery power available, battery health, processor load, user application prioritization, data network speed, virtual machine (VM) availability, type of network connectivity, load sharing, device availability information derived from a user profile associated with the first consumer device 610a, or a combination thereof, for non-limiting example. The device capability information may include processor capability, storage capability, estimate for battery drain over time, other capability information derived from a make and model of the first consumer device 610a, or a combination thereof, for non-limiting example.

The second consumer device 610b may be selected, at least in part, based on at least one characteristic 612b of the second consumer device 610b and a second proximity 614b of the second consumer device 610b to the second end user device 608b. The at least one characteristic 612b of the second consumer device 610b may include device health information, device capability information, or a combination thereof, for non-limiting example. The device health information may include resource utilization, battery power available, battery health, processor load, user application prioritization, data network speed, virtual machine (VM) availability, type of network connectivity, load sharing, device availability information derived from a user profile associated with the second consumer device, or a combination thereof, for non-limiting example. The device capability information may include processor capability, storage capability, estimate for battery drain over time, other capability information derived from a make and model of the second consumer device, or a combination thereof, for non-limiting example.

The first consumer device 610a may be a smart phone, tablet, laptop computer, desktop computer, or other portable or non-portable programmable consumer electronic device capable of computation as well as receiving and sending data via a network for non-limiting example. The second consumer device 610b may be a smart phone, tablet, laptop computer, desktop computer, or other portable or non-portable programmable consumer electronic device capable of computation as well as receiving and sending data via a network for non-limiting example.

As such, with the cloud job manager 604 of the liaison system 623, the cloud job manager of the private cloud, such as the cloud job manager 104 of FIG. 1 or cloud job manager (504a, 504b) of FIG. 5, has been moved out of the private cloud and made common. As such, the liaison system 623 may be implemented, maintained and controlled by a separate business entity, that is, a liaison entity. With this variance, the liaison system 623 represents a layer that becomes common across clouds and the client job manager also becomes common for all clouds.

Use Case Scenarios

An example embodiment can be deployed in cases where the end user is not picky about the infrastructure where the data is processed or computations are done. Some non-limiting example use cases of such scenarios are back end processing for social networking sites, analytics for such social networking sites, analytics for news websites and magazine, computation and processing required for educational websites and tools, meteorological computations for different weather forecasts providers, etc.

According to an example embodiment, a small and medium enterprise (SME) can take advantage of an example embodiment as cloud infrastructure.

According to an example embodiment a SME and universities can run a miniature cloud using e.g., the smart phone infrastructure available within their premises and local network (e.g., using Wi-Fi) and leverage higher computing power.

According to an example embodiment, an example embodiment may be employed in a miniature cloud that can be hosted for gaming enthusiasts with data storage and a main processing hub which uses the smart phones as processing infrastructure and cloud games for small groups can be established.

Security Aspects

In addition to the security of data over the network, an example embodiment keeps the data unexposed inside the consumer device, such as a smart phone for non-limiting example and, as such, prevents the data from being shared to a different cloud. The cloud job manager and client job manager may utilize a pairing mechanism between the cloud platform and the consumer device (e.g., smart phone). Data may be sent between the paired devices in multiple sequences with a sequence id and special encryption methods which can be interpreted only by the corresponding job managers which are paired, such as disclosed above.

Eco System Development

An example embodiment disclosed herein brings innovative developments which will create a complete Eco System on their own. As a non-limiting example, the development of a virtual machine for different smart phone OSs will open up new possibilities and use case scenarios by themselves. New kinds of platform and language independent computation can be thought of, where the end user at the application layer only writes the application in common computational language and it is converted into language that is available in the framework and the OS available in the smart phone. This creates opportunity to develop cloud and smart phone subsystem monitoring tools, which gives rise to big data on usage patterns of the smart phones across the globe.

According to an example embodiment, miniature clouds can be created and maintained within private premises and hosted and maintained within a network, supplementing their own computing needs.

Business Aspects

FIG. 7 is a table 700 of an example embodiment of stake holders 792, their potential investment 794, and their potential return on investment (ROI) 796 based on an employing an example embodiment disclosed herein. It should be understood that the respective summaries of the potential investment 794 and potential ROI 796 in the table 700 are for non-limiting example.

The stake holders 792 include a cloud provider. The cloud provider is a stake holder because these are the providers of cloud infrastructure, who deploy their resources to get the end user application executed. The stake holders 792 include a consumer device (e.g., smart phone) lender. Such a lender is a stake holder because these are the providers of the consumer devices (e.g., smart phones, tablets, etc.) for the use as the computing resource. The stake holders 792 include a cloud end user. The cloud end user is a stake holder because these are the users of the cloud to run their applications.

The stake holders 792 further include a middle liaison. These are the new kind of business entity, disclosed above with regard to FIG. 6, which can be introduced with the implementation of an example embodiment thereof. The middle liaison can independently implement and provide the job handling layer, namely the cloud mob manager 604 of FIG. 6, disclosed above. With this entity, the job handling layer becomes common for all cloud with changes only to the interfaces. This business entity evolves the monitoring and job handling processes and improves it, so that the job execution rate is 100%. This entity handles the pool of smart phones lent, their licensing needs if any, and distributes the computation and ensures that the job requested by the cloud is 100% complete, such as the computational job disclosed below with regard to FIG. 8.

Figure 8:
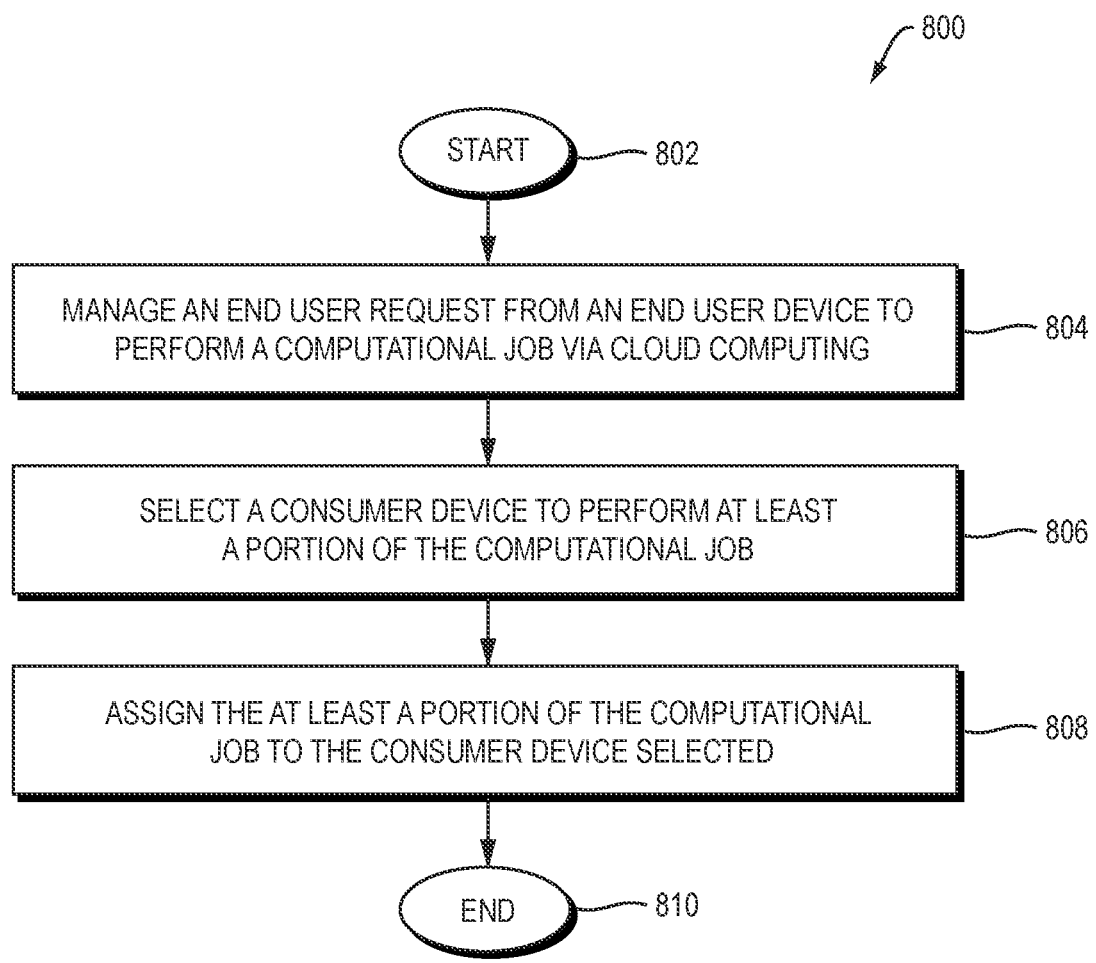
FIG. 8 is a flow diagram of an example embodiment of a computer-implemented method for cloud computing.

FIG. 8 is a flow diagram 800 of an example embodiment of a computer-implemented method for cloud computing. The computer-implemented method begins (802) and manages an end user request from an end user device to perform a computational job via cloud computing (804). To manage the end user request, the computer-implemented method (i) selects a consumer device to perform at least a portion of the computational job, the consumer device selected, at least in part, based on at least one characteristic of the consumer device and proximity of the consumer device to the end user device (806), and (ii) assigns the at least a portion of the computational job to the consumer device selected by transmitting a job request to perform the at least a portion of the computational job, the job request transmitted to the consumer device selected (808). The computer-implemented method thereafter ends (810) in the example embodiment.

The selecting may include selecting the consumer device from among a plurality of consumer devices under lease agreement for use by a cloud service provider system of a cloud service provider. The consumer device selected meets respective criterion for the at least one characteristic and is geographically located closest to the end user device relative to any other consumer device of the plurality of consumer devices meeting the respective criterion.

The computer-implemented method may further comprise computing a profit estimate effected by use of the consumer device for performing the at least a portion of the computational job and selecting the consumer device based on the profit estimate computed. The computer-implemented method may further comprise computing a compensation amount to be paid for use of the consumer device, the compensation amount computed based on the profit estimate determined and selecting the consumer device based on the compensation amount computed.

The assigning may include communicating, over a communications channel, with a client job manager of the consumer device selected. The assigning causes the client job manager to spawn at least one processing task on the consumer device selected. The at least one processing task performs the at least a portion of the computational job.

The computer-implemented method may further comprise assigning a job identifier (ID) to the computational job, assigning a sub-job ID to the at least a portion of the computational job, the sub-job ID associated with the job ID, associating the sub-job ID with a device ID associated with the consumer device selected, and tracking progress of the computational job and associating an indicator of the progress tracked with the job ID.

The computer-implemented method may further comprise fetching data, corresponding to the sub-job ID, from a data storage and transmitting the data fetched to the consumer device selected.

The computational job may be a given computational job among a plurality of computational jobs for assigning to consumer devices. The computer-implemented method may further comprise assigning identifiers (IDs) and employing the IDs assigned for tracking a) assignment of the plurality of computational jobs to respective consumer devices, the respective consumer devices including the consumer device selected, b) which computational jobs of the plurality of computational jobs are split into respective multiple smaller computational jobs, the respective multiple smaller computational jobs assigned for processing in different or same consumer devices, c) which computational jobs of the plurality of computational jobs are in progress, and d) which computational jobs of the plurality of computational jobs are queued for assignment to respective consumer devices.

The computer-implemented method may further comprise monitoring the proximity of the consumer device selected to the end user device, monitoring health of the consumer device selected, and determining whether to offload the at least a portion of the computational job from the consumer device selected to another consumer device based on the proximity and health monitored. Monitoring the proximity and health of the consumer device selected may include communicating over a communications channel with a client job manager of the consumer device selected.

The computer-implemented method may further comprise determining an amount of time for completing the at least a portion of the computational job and selecting the consumer device based on a determination that the consumer device is capable of completing the at least a portion of the computational job in the time determined. The computer-implemented method may further comprise basing the determination on movement of the consumer device, likelihood of call drops of a communications channel for communicating with the consumer device, availability of battery power of the consumer device, an estimate of time for the consumer device to complete the at least a portion of the computational job, an estimate of battery usage by the consumer device to complete the at least a portion of the computational job, or a combination thereof, for non-limiting example.

The computer-implemented method may further comprise computing the estimate of battery usage based on the per-make-and-model consumer device battery characteristics of the consumer device.

The computer-implemented method may further comprise tracking usage parameters associated with implementing the computational job. The usage parameters may include a) per-device processor usage time used by the consumer device selected to perform the at least a portion of the computational job, b) per-process processor usage time used per-process executing on the consumer device selected to perform the at least a portion of the computational job, c) data network usage, or d) a combination of a-c, for non-limiting example.

The computer-implemented method may further comprise communicating in a secure manner with a client job manager of the consumer device selected. The secure manner may include splitting data communicated therebetween into multiple sequences with respective sequence ID values assigned thereto and applying an encryption method to the multiple sequences.

The computer-implemented method may further comprise communicating with a client job manager, of the consumer device selected, to install a virtual operating system (OS) on the consumer device selected. The computer-implemented method may further comprise causing the client job manager to spawn at least one first process on the virtual OS installed, spawn at least one second process on a native OS on the consumer device, or spawn a combination thereof, to perform the at least a portion of the computational job.

Figure 9:
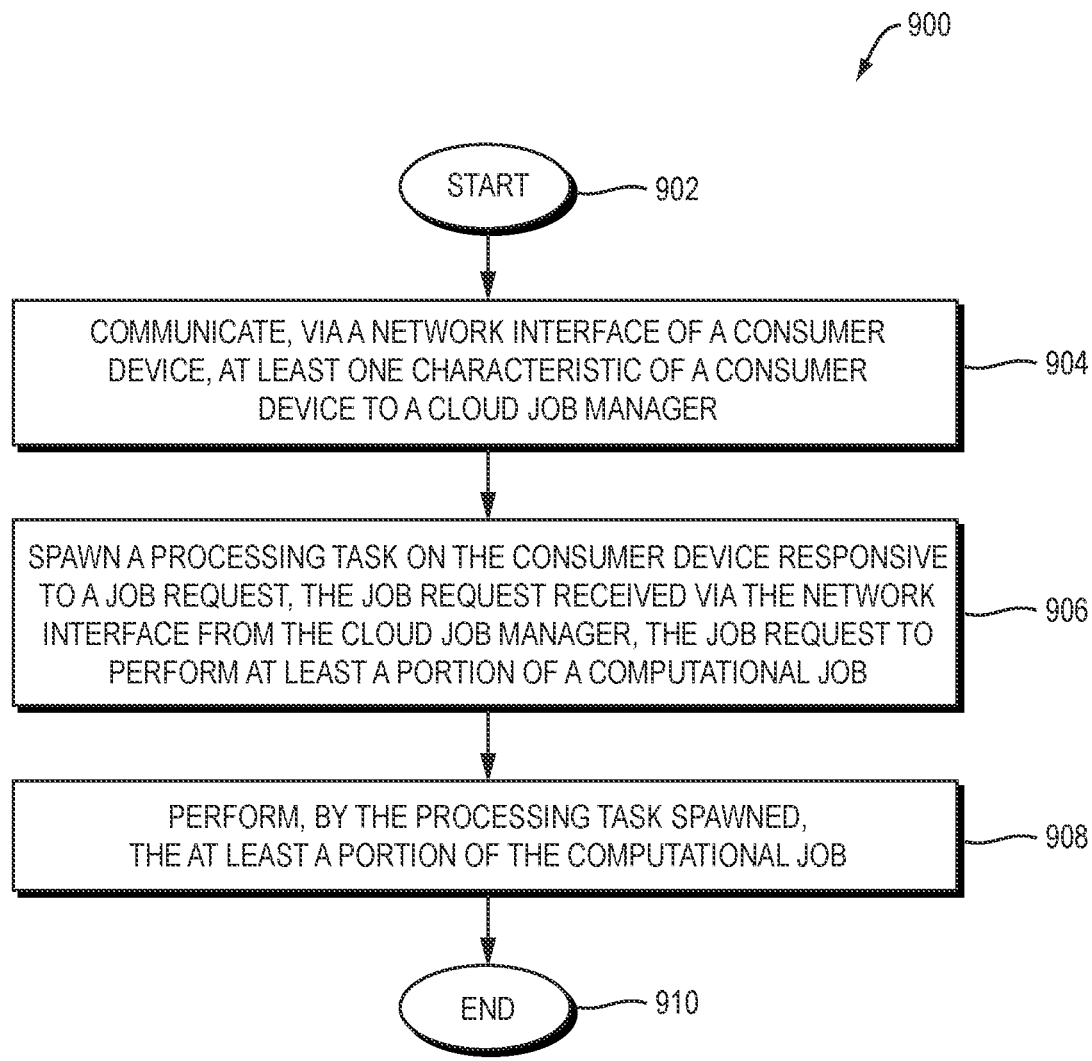
FIG. 9 is flow diagram of an example embodiment of a computer-implemented method that may be implemented on a consumer device.

FIG. 9 is flow diagram 900 of an example embodiment of a computer-implemented method. The computer-implemented method begins (902) and communicates, via a network interface of a consumer device, at least one characteristic of the consumer device to a cloud job manager of a cloud service provider system of a cloud service provider (904). The computer-implemented method spawns a processing task on the consumer device responsive to a job request, the job request received via the network interface from the cloud job manager, the job request to perform at least a portion of a computational job (904). The computational job is requested by an end user device to be performed via cloud computing. The consumer device is selected by the cloud job manager based, at least in part, on proximity of the consumer device to the end user device and the at least one characteristic communicated. The computer-implemented method performs, by the processing task spawned, the at least a portion of the computational job (908) and the computer-implemented method thereafter ends (910) in the example embodiment.

The computer-implemented method may further comprise receiving the job request with a corresponding identifier and data, associating the corresponding identifier received with the processing task spawned, and employing the data in the processing task spawned to perform the at least a portion of the computational job.

The computer-implemented method may further comprise tracking the processing task spawned and notifying the cloud job manager via the network interface of completion of the at least a portion of the computational job. The tracking may include collecting information from the processing task spawned and transmitting, via the network interface, the information collected to the cloud job manager or a data handler coupled to the cloud job manager.

The computer-implemented method may further comprise employing security measures to ensure data integrity of data associated with the at least a portion of the computational job is maintained such that another process of the consumer device does not interfere with, tamper with, or capture data associated with the at least a portion of the computational job.

The computer-implemented method may further comprise tracking usage parameters associated with implementing the at least a portion of the computational job. The usage parameters may include, for non-limiting example, processor usage time, per-process processor usage time, data network usage, or a combination thereof.

The computer-implemented method may further comprise obtaining the at least one characteristic from at least one subsystem of the consumer device.

The computer-implemented method may further comprise communicating, in a secure manner, with the cloud job manager over the network interface. The secure manner may include splitting data communicated therebetween into multiple sequences with respective sequence ID values assigned thereto and applying an encryption method to the multiple sequences.

The cloud job manager may be a first cloud job manager, the cloud service provider system may be a first cloud service provider system of a first cloud service provider, the processing task may be a first processing task, the job request may be a first job request, the computational job may be a first computational job, the end user device may be a first end user device, and the first computational job may be requested by the first end user device to be implemented by the first cloud service provider via cloud computing. The computer-implemented method may further comprise communicating, via the network interface of the consumer device, the at least one characteristic of the consumer device to a second cloud job manager of a second cloud service provider system of a second cloud service provider. The computer-implemented method may further comprise spawning a second processing task on the consumer device responsive to a second job request to perform at least a portion of a second computational job. The second computational job may be requested by a second end user device to be implemented by the second cloud service provider via cloud computing. The second job request may be received from the second cloud job manager via the network interface. The computer-implemented method may further comprise performing, by the second processing task, the at least a portion of the second computational job. The consumer device may be selected by the second cloud job manager based, at least in part, on proximity of the consumer device to the second end user device and the at least one characteristic communicated.

Figure 10:
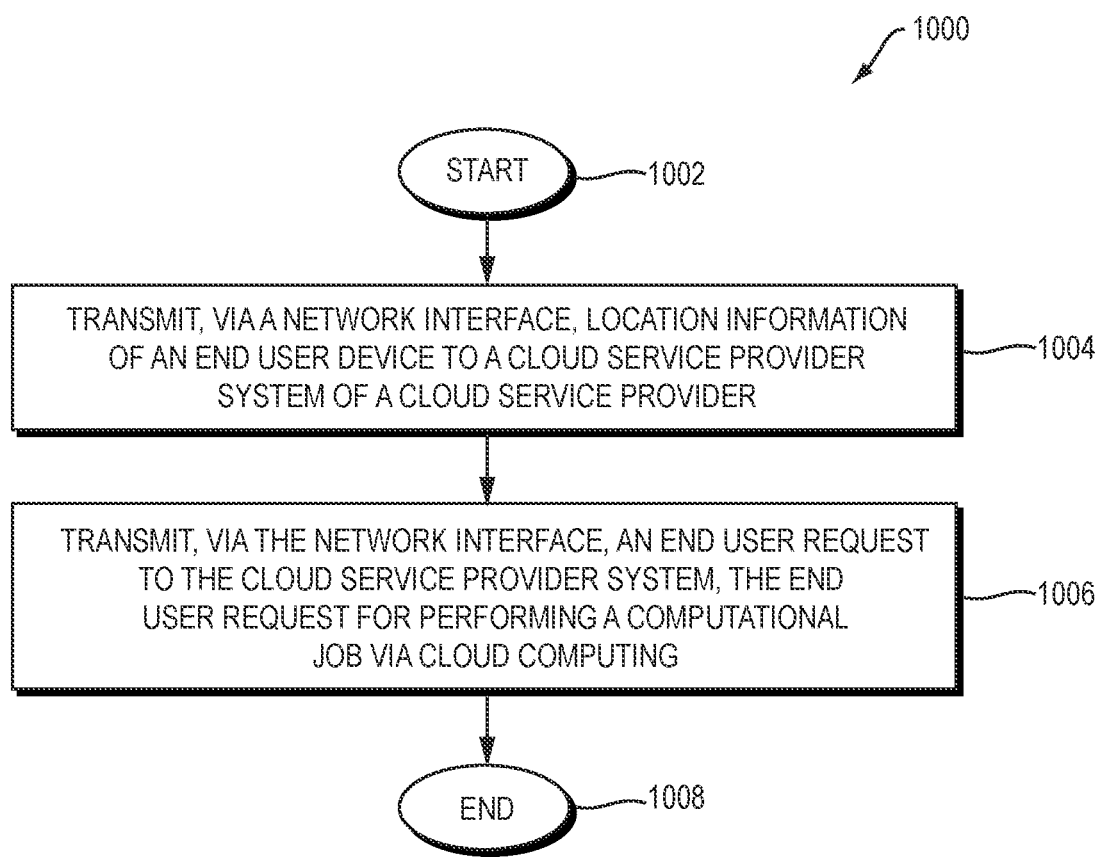
FIG. 10 is a flow diagram of an example embodiment of a computer-implemented method that may be implemented on an end user device.

FIG. 10 is a flow diagram 1000 of an example embodiment of a computer-implemented method. The computer-implemented method begins (1002) and transmits, via a network interface, location information of an end user device to a cloud service provider system of a cloud service provider (1004). The computer-implemented method transmits, via the network interface, an end user request to the cloud service provider system (1006). The end user request is a request for performing a computational job via cloud computing. At least a portion of the computational job is assigned to a consumer device selected by the cloud service provider system. The consumer device is selected, at least in part, based on at least one characteristic of the consumer device and proximity of the consumer device to the end user device. The proximity is determined by the cloud service provider system based on the location information transmitted. The computer-implemented method thereafter ends (1008) in the example embodiment.

Figure 11:
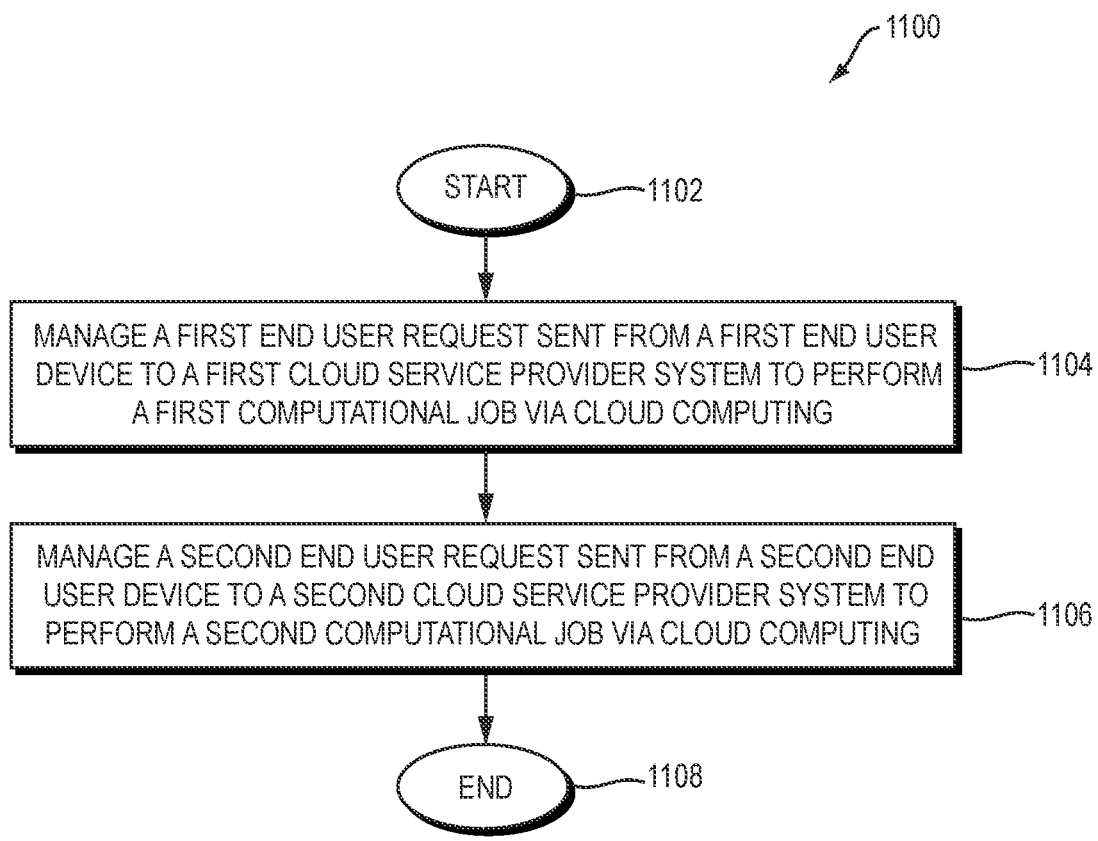
FIG. 11 is a flow diagram of another example embodiment of a computer-implemented method for cloud computing.

FIG. 11 is a flow diagram of an example embodiment of a computer-implemented method for cloud computing. The computer-implemented method begins (1102) and manages a first end user request sent from a first end user device to a first cloud service provider system to perform a first computational job via cloud computing, the managing of the first end user request includes selecting a first consumer device to perform at least a portion of the first computational job and assigning the at least a portion of the first computational job to the first consumer device selected (1104). The computer-implemented method manages a second end user request sent from a second end user device to a second cloud service provider system to perform a second computational job via cloud computing, the managing of the second end user request includes selecting a second consumer device to perform at least a portion of the second computational job and assigning the at least a portion of the second computational job to the second consumer device selected (1106). The first and second consumer devices may be different or same consumer devices in a pool of consumer devices. Th consumer devices in the pool are allocated for use in cloud computing. The method thereafter ends (1108) in the example embodiment.

The computer-implemented method may further comprise selecting the first consumer device based, at least in part, on at least one characteristic of the first consumer device and proximity of the first consumer device to the first end user device. The computer-implemented method may further comprise selecting the second consumer device based, at least in part, on at least one characteristic of the second consumer device and proximity of the second consumer device to the second end user device.

FIG. 12 is a block diagram of an example of the internal structure of a computer 1200 in which various embodiments of the present disclosure may be implemented. The computer 1200 contains a system bus 1252, where a bus is a set of hardware lines used for data transfer among the components of a computer or digital processing system. The system bus 1252 is essentially a shared conduit that connects different elements of a computer system (e.g., processor, disk storage, memory, input/output ports, network ports, etc.) that enables the transfer of information between the elements. Coupled to the system bus 1252 is an I/O device interface 1254 for connecting various input and output devices (e.g., keyboard, mouse, display monitors, printers, speakers, etc.) to the computer 1200. A network interface 1256 allows the computer 1200 to connect to various other devices attached to a network (e.g., global computer network, wide area network, local area network, etc.). Memory 1258 provides volatile or non-volatile storage for computer software instructions 1260 and data 1262 that may be used to implement embodiments (e.g., methods of the flow diagrams 800, 900, 1000, and 1100) of the present disclosure, where the volatile and non-volatile memories are examples of non-transitory media. Disk storage 1264 provides non-volatile storage for computer software instructions 1260 and data 1262 that may be used to implement embodiments (e.g., methods of the flow diagrams 800, 900, 1000, and 1100) of the present disclosure. A central processor unit 1266 is also coupled to the system bus 1252 and provides for the execution of computer instructions.

As used herein, the term "manager" or "layer" may refer to any hardware, software, firmware, electronic control component, processing logic, and/or processor device, individually or in any combination, including without limitation: an application specific integrated circuit (ASIC), a field-programmable gate-array (FPGA), an electronic circuit, a processor and memory that executes one or more software or firmware programs, and/or other suitable components that provide the described functionality. According to a non-limiting example embodiment, a "manager" or "layer" may include at least one processor and at least one memory with computer code instructions stored thereon. The at least one processor and the at least one memory, with computer code instructions, may be configured to cause the manager or layer to perform its respective configured functions.

Example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 12, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A consumer device comprising:
   at least one processor;
   a non-transitory computer-readable medium having encoded thereon a sequence of instructions which, when loaded and executed by a processor of the at least one processor, causes the processor to spawn a processing task on the consumer device responsive to a job request to perform at least a portion of a computational job, the computational job requested by an end user device to be performed via cloud computing; and
   a network interface coupled to the at least one processor, the job request received via the network interface from a cloud job manager of a cloud service provider system of a cloud service provider, the processing task configured to perform the at least a portion of the computational job, the consumer device selected by the cloud job manager based, at least in part, on proximity of the consumer device to the end user device and at least one characteristic of the consumer device, wherein the sequence of instructions further causes the processor to communicate the at least one characteristic to the cloud job manager via the network interface.

2. The consumer device of claim 1, wherein the consumer device is a smart phone, tablet, laptop computer, desktop computer, or other portable or non-portable programmable consumer electronic device capable of computation as well as receiving and sending data via a network.

3. The consumer device of claim 1, wherein the job request is received with a corresponding identifier and data, wherein the sequence of instructions further causes the processor to associate the corresponding identifier received with the processing task spawned, and wherein the processing task spawned is configured to employ the data to perform the at least a portion of the computational job.

4. The consumer device of claim 1, wherein the sequence of instructions further causes the processor to track the processing task spawned and notify the cloud job manager via the network interface of completion of the at least a portion of the computational job.

5. The consumer device of claim 1, wherein the sequence of instructions further causes the processor to track the processing task spawned and transmit, via the network interface, information collected from the processing task spawned to the cloud job manager or a data handler coupled to the cloud job manager.

6. The consumer device of claim 1, wherein the sequence of instructions further causes the processor to employ security measures to ensure data integrity of data associated with the at least a portion of the computational job is maintained such that another processor of the at least one processor or a process of the consumer device does not interfere with, tamper with, or capture data associated with the at least a portion of the computational job.

7. The consumer device of claim 1, wherein the sequence of instructions further causes the processor to track usage parameters associated with implementing the at least a portion of the computational job, the usage parameters including:

total usage time of the processor; per-process usage time of the processor; data network usage; or a combination thereof.

8. The consumer device of claim 1, wherein the at least one characteristic includes device health information, device capability information, or a combination thereof.

9. The consumer device of claim 8, wherein the device health information includes resource utilization, battery power available, battery health, processor load, user application prioritization, data network speed, virtual machine (VM) availability, type of network connectivity, load sharing, device availability information derived from a user profile associated with the consumer device, or a combination thereof, and wherein the device capability information includes processor capability, storage capability, estimate for battery drain over time, other capability information derived from a make and model of the consumer device, or a combination thereof.

10. The consumer device of claim 1, further comprising at least one subsystem and wherein the at least one characteristic is obtained by the processor from the at least one subsystem.

11. The consumer device of claim 1, wherein the sequence of instructions further causes the processor to communicate in a secure manner with a cloud job manager over the network interface, wherein the secure manner includes splitting data communicated therebetween into multiple sequences with respective sequence ID values assigned thereto and applying an encryption method to the multiple sequences, wherein the cloud job manager and the processor form a pairing of job managers, and wherein the encryption method is limited to interpretation by the job managers in the pairing.

12. The consumer device of claim 1, wherein the processor is a first processor, wherein the at least one processor includes a second processor, wherein the cloud job manager is a first cloud job manager, wherein the cloud service provider system is a first cloud service provider system of a first cloud service provider, wherein the processing task is a first processing task, wherein the job request is a first job request, wherein the computational job is a first computational job, wherein the end user device is a first end user device, wherein the first computational job is requested by the first end user device to be performed via cloud computing of the first cloud service provider, and wherein:

the second processor is configured to spawn a second processing task on the consumer device responsive to a second job request to perform at least a portion of a second computational job, the second computational job requested by a second end user device to be performed via cloud computing of a second cloud service provider; and the second job request is received from a second cloud job manager via the network interface from a second cloud service provider system of the second cloud service provider, the second processing task configured to perform the at least a portion of the second computational job, the consumer device selected by the second cloud job manager based, at least in part, on proximity of the consumer device to the second end user device and at least one characteristic of the consumer device, the second processor further configured to communicate the at least one characteristic to the second cloud job manager via the network interface.

13. A computer-implemented method comprising:

communicating, via a network interface of a consumer device, at least one characteristic of the consumer device to a cloud job manager of a cloud service provider system of a cloud service provider;

spawning a processing task on the consumer device responsive to a job request, the job request received via the network interface from the cloud job manager, the job request to perform at least a portion of a computational job, the computational job requested by an end user device to be performed via cloud computing, the consumer device selected by the cloud job manager based, at least in part, on proximity of the consumer device to the end user device and the at least one characteristic communicated; and performing, by the processing task spawned, the at least a portion of the computational job.

14. The computer-implemented method of claim 13, wherein the consumer device is a smart phone, tablet, laptop computer, desktop computer, or other portable or non-portable programmable consumer electronic device capable of computation as well as receiving and sending data via a network.

15. The computer-implemented method of claim 13, further comprising receiving the job request with a corresponding identifier and data, associating the corresponding identifier received with the processing task spawned, and employing the data in the processing task spawned to perform the at least a portion of the computational job.

16. The computer-implemented method of claim 13, further comprising tracking the processing task spawned and notifying the cloud job manager via the network interface of completion of the at least a portion of the computational job.

17. The computer-implemented method of claim 13, further comprising:

tracking the processing task spawned, the tracking including collecting information from the processing task spawned; and transmitting, via the network interface, the information collected to the cloud job manager or a data handler coupled to the cloud job manager.

18. The computer-implemented method of claim 13, further comprising:

employing security measures to ensure data integrity of data associated with the at least a portion of the computational job is maintained such that another process of the consumer device does not interfere with, tamper with, or capture data associated with the at least a portion of the computational job.

19. The computer-implemented method of claim 13, further comprising tracking usage parameters associated with implementing the at least a portion of the computational job, the usage parameters including:

processor usage time;

per-process processor usage lime;

data network usage; or a combination thereof.

20. The computer-implemented method of claim 13, wherein the at least one characteristic includes device health information, device capability information, or a combination thereof.

21. The computer-implemented method of claim 20, wherein the device health information includes resource utilization, battery power available, battery health, processor load, user application prioritization, data network speed, virtual machine (VM) availability, type of network connectivity, load sharing, device availability information derived from a user profile associated with the consumer device, or a combination thereof, and wherein the device capability information includes processor capability, storage capability, estimate for battery drain over time, other capability information derived from a make and model of the consumer device, or a combination thereof.

22. The computer-implemented method of claim 13, obtaining the at least one characteristic from at least one subsystem of the consumer device.

23. The computer-implemented method of claim 13, further comprising:

communicating, in a secure manner, with the cloud job manager over the network interface, wherein the secure manner includes splitting data communicated therebetween into multiple sequences with respective sequence ID values assigned thereto and applying an encryption method to the multiple sequences.

24. The computer-implemented method of claim 13, wherein the cloud job manager is a first cloud job manager, wherein the cloud service provider system is a first cloud service provider system of a first cloud service provider, wherein the processing task is a first processing task, wherein the job request is a first job request, wherein the computational job is a first computational job, wherein the end user device is a first end user device, wherein the first computational job is requested by the first end user device to be implemented by the first cloud service provider via cloud computing, and wherein the computer-implemented method further comprises:

communicating, via the network interface of the consumer device, the at least one characteristic of the consumer device to a second cloud job manager of a second cloud service provider system of a second cloud service provider;

spawning a second processing task on the consumer device responsive to a second job request to perform at least a portion of a second computational job, the second computational job requested by a second end user device to be implemented by the second cloud service provider via cloud computing, the second job request received from the second cloud job manager via the network interface; and performing, by the second processing task, the at least a portion of the second computational job, the consumer device selected by the second cloud job manager based, at least in part, on proximity of the consumer device to the second end user device and the at least one characteristic communicated.

25. A non-transitory computer-readable medium having encoded thereon a sequence of instructions which, when loaded and executed by at least one processor, causes the at least one processor to:

communicate, via a network interface of a consumer device, at least one characteristic of the consumer device to a cloud job manager of a cloud service provider system of a cloud service provider;

spawn a processing task on the consumer device responsive to a job request, the job request received via the network interface from the cloud job manager, the job request to perform at least a portion of a computational job, the computational job requested by an end user device to be performed via cloud computing, the consumer device selected by the cloud job manager based, at least in part, on proximity of the consumer device to the end user device and the at least one characteristic communicated; and perform, via the processing task spawned, the at least a portion of the computational job.

\* \* \* \* \*